United States Patent
Olsen et al.

(10) Patent No.: US 10,991,245 B2
(45) Date of Patent: Apr. 27, 2021

(54) SYSTEM AND METHOD OF TWO-WAY WIRELESS COMMUNICATION FOR CONNECTED CAR VEHICLE

(71) Applicant: RPMA Investments ApS, Sonderborg (DK)

(72) Inventors: Jan Olsen, Dubai (AE); Frederic Lyman Wohl, Dubai Internet (AE)

(73) Assignee: RPMA Investments ApS, Sonderborg (DK)

(*) Notice: Subject to any disclaimer, the term of this patent is extended or adjusted under 35 U.S.C. 154(b) by 0 days.

(21) Appl. No.: 16/253,480

(22) Filed: Jan. 22, 2019

(65) Prior Publication Data
US 2019/0228654 A1    Jul. 25, 2019

Related U.S. Application Data

(60) Provisional application No. 62/619,984, filed on Jan. 22, 2018.

(51) Int. Cl.
*G08G 1/0967* (2006.01)
*G07C 5/00* (2006.01)
(Continued)

(52) U.S. Cl.
CPC ....... *G08G 1/096716* (2013.01); *B60W 40/09* (2013.01); *G07C 5/008* (2013.01);
(Continued)

(58) Field of Classification Search
CPC ............. G08B 21/02; G08G 1/096783; G08G 1/096716; G08G 1/081; G08G 1/207;
(Continued)

(56) References Cited

U.S. PATENT DOCUMENTS 7,472,202 B2    12/2008 Parupudi et al.
8,140,358 B1 *   3/2012 Ling ................. G07C 5/008
                                                        705/4
(Continued)

FOREIGN PATENT DOCUMENTS

CN    105291977 A    2/2016

OTHER PUBLICATIONS

Ingenu, Ingenu Expands Global Network, Providing IoT connectivity to over 29 Countries, and Growing. 2008. [retrieved on Mar. 31, 2019]. Retrieved from the Internet<URL: https://www.ingenu.com/tag/machine-network/> entire document.
(Continued)

*Primary Examiner* — Hoi C Lau
(74) *Attorney, Agent, or Firm* — Pilloff Passino & Cosenza LLP; Sean A. Passino; Rachel K. Pilloff

(57) ABSTRACT

Disclosed is a system and method of two-way wireless-communication of vehicular status with one or more different recipient computer servers operated by one or more third parties to promote safer driving. The wireless-communication is based on the low-power, wide-area communication technology, particularly Random Phase Multiple Access (RPMA) communication network. The system consists of a device connected to an On-board diagnostics (OBD) port on the vehicle and onboard sensors whose data are locally processed to provide guidance to the driver. The device utilizes an audio unit, a display unit, and/or a combination thereof to warn about a potential hazard. The device further includes a plurality of sensors to sense the plurality of events. Further, On-Board AI connector, wherein the device communicates with external systems installed in the vehicle ex: camera or other sensor to record and/or analyze human behavior in detail and report drowsy driving, distracted driving, usage of mobile phones or other devices while
(Continued)

driving etc. when the driver is recognized to be in one of these states the device plays an appropriate audio message to alert the driver.

15 Claims, 18 Drawing Sheets

(51) Int. Cl.
  *G07C 5/08* (2006.01)
  *G08G 1/052* (2006.01)
  *B60W 40/09* (2012.01)
  *G08G 1/01* (2006.01)
  *G08G 1/00* (2006.01)
  *G01P 1/12* (2006.01)

(52) U.S. Cl.
  CPC ......... *G07C 5/0841* (2013.01); *G08G 1/0112* (2013.01); *G08G 1/0141* (2013.01); *G08G 1/052* (2013.01); *G08G 1/096741* (2013.01); *G08G 1/096775* (2013.01); *G08G 1/207* (2013.01); *B60W 2540/043* (2020.02); *B60W 2540/26* (2013.01); *B60W 2540/30* (2013.01); *B60W 2555/20* (2020.02); *G01P 1/122* (2013.01)

(58) Field of Classification Search
  CPC .......... G08G 1/0112; G08G 1/096855; G08G 1/097; G08G 1/00; G08G 1/0967; B60R 25/102; B60W 40/09; G01C 21/32; G01C 21/06; G01C 21/26; G01C 21/34; H04W 4/021; H04W 4/024; H04W 4/029; G07C 5/008
  See application file for complete search history.

(56) References Cited

U.S. PATENT DOCUMENTS

| | | | |
|---|---|---|---|
| 8,576,069 B2 * | 11/2013 | Nadeem ........... | G08G 1/096775 340/539.25 |
| 8,831,069 B2 * | 9/2014 | Sinsuan .............. | H04B 1/7103 340/870.02 |
| 8,989,914 B1 * | 3/2015 | Nemat-Nasser ... | G06K 9/00335 701/1 |
| 8,996,234 B1 * | 3/2015 | Tamari ................ | G07C 5/085 701/29.3 |
| 9,019,096 B2 * | 4/2015 | Cordaro ............... | H04W 28/04 340/521 |
| 9,102,294 B2 | 8/2015 | Oliver | |
| 9,226,115 B2 | 12/2015 | Raghunathan et al. | |
| 9,333,913 B1 | 5/2016 | Elders et al. | |
| 9,424,608 B2 | 8/2016 | Greenberg et al. | |
| 9,439,121 B2 | 9/2016 | Barreto De Miranda Sargento et al. | |
| 9,674,880 B1 | 6/2017 | Egner et al. | |
| 10,467,473 B1 * | 11/2019 | Adler .................. | G06N 3/0454 |
| 2008/0252487 A1 * | 10/2008 | McClellan ............ | G08G 1/052 340/936 |
| 2008/0258890 A1 * | 10/2008 | Follmer ............... | B60R 25/102 340/439 |
| 2008/0319602 A1 * | 12/2008 | McClellan ............ | G07C 5/008 701/31.4 |
| 2009/0140886 A1 | 6/2009 | Bender | |
| 2010/0045452 A1 * | 2/2010 | Periwal ................ | B60Q 9/00 340/439 |
| 2010/0253526 A1 * | 10/2010 | Szczerba ............... | G08B 21/06 340/576 |
| 2013/0013348 A1 | 1/2013 | Ling et al. | |
| 2013/0096731 A1 * | 4/2013 | Tamari ................ | G08G 1/0133 701/1 |
| 2013/0187792 A1 | 7/2013 | Egly | |
| 2013/0204484 A1 | 8/2013 | Ricci | |
| 2013/0293389 A1 * | 11/2013 | Sinsuan .................. | H04J 13/00 340/870.02 |
| 2013/0300576 A1 * | 11/2013 | Sinsuan ............. | H04J 13/0029 340/870.02 |
| 2015/0035665 A1 | 2/2015 | Plante et al. | |
| 2015/0084766 A1 * | 3/2015 | Cordaro ................. | G01S 19/48 340/521 |
| 2015/0206434 A1 * | 7/2015 | Shimotani ............. | G08G 1/163 701/36 |
| 2015/0241231 A1 | 8/2015 | Abramson et al. | |
| 2016/0055747 A1 | 2/2016 | Ricci | |
| 2016/0057635 A1 | 2/2016 | Liu et al. | |
| 2016/0086397 A1 * | 3/2016 | Phillips ................ | G07C 5/0808 701/32.4 |
| 2017/0197617 A1 | 7/2017 | Penilla et al. | |
| 2017/0316621 A1 * | 11/2017 | Jefferies ................ | G06Q 50/30 |
| 2019/0066404 A1 * | 2/2019 | Badri ........................ | G07C 5/08 |
| 2019/0126935 A1 * | 5/2019 | Phillips ............. | B60W 50/0098 |
| 2019/0228654 A1 * | 7/2019 | Olsen ................ | G08G 1/096775 |
| 2020/0101981 A1 * | 4/2020 | Phillips ............. | B60W 50/0098 |

OTHER PUBLICATIONS

International Search Report and Written Opinion for PCT/US2019/014463, dated Apr. 29, 2019.
PCT Application No. PCT/US19/14463 was filed on Jan. 22, 2019.

* cited by examiner

SYSTEM AND METHOD OF TWO-WAY WIRELESS COMMUNICATION FOR CONNECTED CAR VEHICLE

CROSS REFERENCE

This application claims priority benefit of U.S. Provisional application No. 62/619,984, filed 22 Jan. 2018, the entire content of which application is incorporated herein by reference.

TECHNICAL FIELD

The present invention relates to a system and method of utilizing a low-power, wide-area communication technology, particularly Random Phase Multiple Access (RPMA) communication network and/or a cellular based communication technology i.e. 3G, 4G/LTE, 5G communication network, to establish a two-way wireless communication of a "Connected Car" vehicle's status in real-time or near-real-time to and from a vehicle containing this invention with different recipients including the vehicle's owner, other nearby vehicles, governmental and other agencies, interested third parties, and communicating infrastructure such as smart stoplights and street lights. The present invention allows user to monitor and correct his vehicle's compliance with traffic regulations prior to reporting violations to law enforcement or other agencies, and to monitor the vehicle's mechanical status or manufacturer status so the user always knows the status of individual's vehicle.

A major objective of the present invention is to provide law enforcement with a real-time view of drivers within their jurisdiction to identify potential driving infractions after the driver has been notified and given a chance to correct their driving behavior that potentially violates local laws. The system first notifies the driver about an infraction, giving them fair warning to modify their driving behavior, and, if not modified, the system provides a method for having the law enforcement agency to issue fines and black points.

The invention submits a unique On-Board diagnostic Augmented Intelligence connector wherein the device communicates with external sensors installed in the vehicle ex: in ward facing camera or other sensor to analyze and report human behavior in detail. The sensor studies and reports drowsy driving, distracted driving, usage of mobile phones or other devices while driving. when the driver is recognized to be in one of these states the device plays an appropriate audio message to alert the driver to improve overall safety. The sensor can also be used to monitor the passengers in the vehicle and the device can generate appropriate alerts. Ex: report unattended kids/pets in the vehicle, monitor the count/entry/exit of children in a school bus.

More particularly the infrastructure records the driver's behavior e.g. eye movement, acceleration, deceleration, and sudden braking etc, and overtime uses those data to distinguish between the other drivers and accordingly score the drivers behavior.

BACKGROUND

The number of vehicles on the road is increasing every year. With the increase of vehicles the number of threats to each driver and vehicle increases due to the safety issues a single driver can pose for other drivers if that driver does not drive safely. Safety issues include but are not limited to the driver driving too fast or too slow, accelerating too fast, deaccelerating too fast, cornering too fast, changing lanes too fast, driving without seatbelt(s) being fastened, driving inappropriately when an emergency vehicle or accident is nearby or during inclement weather, driving with an under-inflated tire, driving when the vehicle is mechanically impaired, and driving without headlights or other safety equipment when they are required. Additionally, other road conditions, traffic, variable speed limits based on road conditions, weather adversity or any other potentially dangerous events nearby may pose a threat about which the driver should be aware. The invention also presents a novel service called an E-call service, which is a service designed to provide quick response in case of emergency ex: a road accident The following below key points to be considered during the situation: —

Call button—The call can be made manually by vehicle occupants by pressing a button (the button is a part of the hardware)—or the call can be made automatically by the system if the car sensors detect that a serious accident has occurred.

Air-bag deployment—the air bag deployment status to be reported

Location & timestamp—the GPS location of the vehicle to be reported (lat & long)

Triggering mode—if the e-call was triggered automatically or manually

VIN, number plate and date-time stamp—associated vehicle identification number, or number plate details are to be reported Driver behavior analysis:—The present invention also submits the analysis report on the behavior of the Driver while driving the vehicle. The data processing unit analyzes the sensor data in light of received data to guide driver and understand the Driver's behavior such as phone usage, tired, and/or inattentive and/or distracted towards the goal. More particularly the infrastructure records the driver's behavior e.g. eye movement, acceleration, deceleration, and sudden braking etc, and overtime uses those data to distinguish between the other drivers and accordingly score the drivers behavior.

Various Vehicle-to-Vehicle or Vehicle-to-Infrastructure communication technology-based systems have been previously proposed to reduce the number of vehicular threats leading to accidents. However, such prior art Vehicle-to-Vehicle technology-based systems are not in widespread use, nor is widespread use being implemented or planned due to a number of complexities and implicit flaws in these prior art designs. An initial complexity is that prior art devices have relied upon expensive communication technologies so are expensive for the driver to use. Another complexity hindering adoption of these prior art devices is that they would automatically notify law enforcement agencies about driving infractions without giving the driver the opportunity to correct the issue which makes using these systems punitive rather than supportive for the driver and discourages the use of such systems. A third complexity is that prior art devices compromised the vehicle's data security by making the vehicle identification publicly stored which allows others to access vehicle information which can be a major concern for many vehicle owners. These complexities and design flaws have hindered development, and added cost which have further delayed their deployment. Additionally, these existing prior art systems and methods are not likely to be effective at significantly reducing accidents for many years even if they are deployed because of the way they display information for the driver. Such prior art systems do not provide the driver with a quick, intuitive view of issues related to their driving.

The present invention addresses the shortfalls from prior art devices discussed above as well as other shortfalls not described, and provides for a low-cost communication device to connect the vehicle to the driver and other nearby vehicles or infrastructure and also allows the user to improve his or her driving behavior when the device detects any driving infraction. The device only reports the infraction to the authorities if the driving behavior doesn't improve beyond a given set time, and provides a very secure data communication environment for vehicular information.

Advantages of the present invention over prior art will become apparent to one skilled in the art as they read the remainder of this document and associated drawings.

REFERENCES

With reference to the prior application No. U.S. Pat. No. 9,226,115 B2, patent application demonstrates only Context-aware in-vehicle dashboard, on the other hand the present invention utilizes Random Phase Multiple Access (RPMA) technology to connect vehicles and enables a safe and secure communications among the vehicles, infrastructure, and personal communications devices. Further to this the present invention submits a secure system and infrastructure in an innovative manner that allows the drivers to receive warnings of potential hazards through a visual display or audio. In addition to this, the proposed system provides various advantages to the driver by reducing time to find a car in crowded parking lot, reducing parking costs by finding nearest free parking, cheap fuel, charging station, and reducing driving time by re-routing cars to prevent congestion.

Furthermore, the proposed system provides law enforcement in real time by notifying the driver about infractions, giving warnings, issuing fines and black points, i.e. remotely real-time law enforcement, and protecting some classes of drivers remotely (ambulance, female drivers etc.).

The US Patent Application No.:—U.S. Pat. No. 7,472,202 B2 represents Context-aware systems and methods, location-aware systems and methods, context-aware vehicles and methods of operating the same, and location-aware vehicles and methods of operating the same.

The US Patent Application No.: U.S. Pat. No. 9,674,880 B1 defines Method and apparatus for a smart vehicle gateway with connection context aware radio communication management and multi-radio technology The present invention provides a novel, unique and innovative methodology how the driver receives warning signals in a plurality of situations such as:
 a. When the Device is disconnected from OBD-II
 b. When an emergency vehicle is in the vicinity
 c. When risk (weather, accident, traffic, etc.) in vicinity
 d. When road closure is nearby
 e. When car status needs attention (e.g., low fuel)
 f. When driving is erratic
 g. When driver appears to be fatigued or distracted
 h. When fine is about to be levied
 i. Auto-levy fine if the driver has not remedied offense in certain time period
 i. When geo-fence boundary has been crossed (plus or minus 10 m)
  i. Dynamic geo-fence
  ii. Static geo-fence
 j. When seatbelt is not connected and the car is moving
 k. When e-Parking needs to be paid electronically
 l. When e-Toll needs to be automatically paid
 m. When the car has been impounded by third-party
 n. When the low battery in Device
 o. Other customized alerts can be implemented
 p. under speed and/or over speed US 20130187792 A1 demonstrates Early warning system for traffic signals and conditions and the present invention provides a system which communicates with a central server to perform following functions:
 a. Uplink to central server only when a trigger event happens (ie speed penalty, seatbelt violation, or any other custom logic)
 b. Downlink over the air Firmware upgrades, maps, additional applications (ie tracking feature, virtual toll gate, e-parking, etc.)

In order to the above cited reference, it is clear that none of the cited prior-arts are disclosing the primary key feature of the present invention i.e. to utilizing Random Phase Multiple Access (RPMA) technology i.e. 3G, 4G/LTE, 5G communication network to connect vehicles and enables a safe and secure communications among the vehicles, infrastructure, and personal communications devices. The subject matter of the present invention has novel features such as RPMA technology, unique warning and communication system

EMBODIMENTS OF THE INVENTION

The present invention introduces unique new technologies to resolve the complexities that have plagued prior art and to more quickly improve the safety of the vehicular owner and the driving public. The primary purpose of the present invention is to improve driving safety by identifying hazardous driving by the vehicle's driver or by nearby drivers given the current, immediate environmental conditions as well as vehicular mechanical status that could be hazardous.

The invention submits a unique On-Board Augmented Intelligence connector wherein the device communicates with external sensors installed in the vehicle ex: in ward facing camera or others sensor to analyze or report human behavior in detail. The sensor studies and reports drowsy driving, distracted driving, usage of mobile phones or other devices while driving. when the driver is recognized to be in one of these states the device plays an appropriate audio message to alert the driver to improve overall safety. The sensor can also be used to monitor the passengers in the vehicle and the device can generate appropriate alerts. Ex: report unattended kids/pets in the vehicle, monitor the count/entry/exit of children in a school bus.

The invention also presents a novel service called an E-call service, which is a service designed to provide quick response in case of emergency ex: a road accident The following below key points to be considered during the situation: —

Call button—The call can be made manually by vehicle occupants by pressing a button (the button is a part of the hardware)—or the call can be made automatically by the system if the car sensors detect that a serious accident has occurred.

Air-bag deployment—the air bag deployment status to be reported

Location & timestamp—the GPS location of the vehicle to be reported (lat & long)

Triggering mode—if the e-call was triggered automatically or manually

VIN, number plate and date-time stamp—associated vehicle identification number, or number plate details are to be reported Driver behavior analysis:—The present invention also submits the analysis report on the behavior of the Driver while driving the vehicle. The data processing unit analyzes the sensor data in light of received data to guide driver and understand the Driver's behavior such as phone usage, tired, and/or inattentive and/or distracted towards the goal. More particularly the infrastructure records the driver's behavior e.g. eye movement, acceleration, deceleration, and sudden braking etc, and overtime uses those data to distinguish between the other drivers and accordingly score the drivers behavior.

SUMMARY

The present invention provides a number of other goals beyond driver safety improvement including improving traffic flow and reducing congestion during normal driving and at accident sites or traffic jams. Furthermore, it also provides a system and method to collect information from vehicles and communicate with a number of government regulatory bodies including law enforcement agencies about potential law violations; warning the driver in real-time about such violations and providing them a chance to correct the poor driving before fines and black marks are levied. Communicating with nearby infrastructure such as stoplights and street lights can also improve the driving experience by allowing this smart infrastructure to make smarter decisions.

For the driver, the present invention notifies them in advance about traffic, road, and weather conditions which allows the driver to make appropriate course corrections, provides them other services and it notifies the vehicle owner about potential mechanical issues that can be easily and more cheaply resolved when identified early.

An alternative embodiment of the device allows a fleet owner or other authorized person to plan different geo-fencing regime for different drivers by identifying a driver utilizing a RPMA communication unit i.e. 3G, 4G/LTE, 5G communication network, collecting vehicle route information with the help of an OBD-connector and vehicular GPS. A processing unit on the device can analyze these data and respond to the geofence command created by the fleet owner or other authorized person. This system will also generate alerts to the driver or any authorized recipient in case the vehicle violates the geo-fencing area for that driver.

The present invention is a small form factor, stand-alone, two-way communication device that is mounted on the vehicle and connected both wired and wirelessly to a number of other components. This mounting makes the vehicle a "Connected Car". The present invention is a two-way wireless communication system that includes these components:
 a two-way, wireless communication multi-mode module (preferably RPMA) and or 3G, 4G/LTE, 5G
 one or more in-vehicle sensors generating data,
 a data processing unit to analyze sensor data in light of received data to guide driver,
 memory storage,
 an audio unit,
 a Bluetooth module to communicate with in-vehicle smart phone/tablet,
 a wired connection to the vehicle through the OBD-connector and
 a battery.

Each of these components will be described in more detail in the detailed description section of this document. However, it should be mentioned that two types of data sensors are part of and central to the present invention: built-in sensors to collect input data about the vehicle's immediate external environment and the performance of the vehicle's driver, and sensors which connect to the vehicle's On Board Dash (OBD or OBD-II hereafter called "OBD") connector to provide the present invention with vehicle information including operating and mechanical information.

The complete present invention makes the vehicle part of an Internet of Things (IoT) network which connects the vehicle with the driver, with other nearby vehicles, with interested third-party organizations including law enforcement, and with communicating "smart" infrastructure to achieve the previously listed objectives for the present invention. The individual vehicle communicates with the broader network using intermediate, relay wireless communication Access Points which are fixed, two-way communication devices that wirelessly communicate with the vehicle over the air and relay this communication to a data network via fixed landlines or wirelessly.

In some embodiments, a system of two-way wireless communication for monitoring and controlling vehicle, includes an input unit, a processing unit and an output unit. An input unit comprises one or more in-vehicle sensors for real time detection in and around vehicle; an OBD (Onboard Diagnostic) connector device for real time monitoring driving conditions and driver behavior, Law enforcement representation with a real time view of drivers to identify the potential driving infractions. A processing unit comprises a computerized data processing unit to analyze data from one or more sensors and the OBD connector device; a communication unit to establish a two-way communication network between vehicle and different recipients such as insurance companies, public authorities, police and car manufacturer as described in the specification; and On-Board Augmented Intelligence processing device that communicates with external sensors installed in the vehicle to record human behavior in detail and report things like drowsy driving, distracted driving, the usage of mobile phones or other devices when driving etc. When the prohibited usage situation is recognized or a driver is determined to be in one of these states, the onboard processing unit will based on its internal logic use an appropriate audio message or other notification to alert the driver via one or more of the output units. An output unit comprises an audio unit containing speakers and an amplifier, a mobile phone application, a desktop solution being used by users such as the Police, the public authorities or/and the insurance companies for reporting, driver statics, issuance of fines for violations, setting parameters for, and enforcement of: driving rules, road conditions, speed limits, traffic regulations and central management of the overall solution.

In some embodiments, the OBD connector device collects (at least one) of vehicle's operation data which is related to speed during acceleration and deceleration, driver's seat belt connection detection, engine and operational parameters including but not limited to oil level, temperature, fuel & water levels, light status (internal and external), tire pressures, filter status, potential leaks and fluid levels, wiper status, indicators, "idiot-light" status, turning force, number of passengers, cruise control system status, and lane departure warning.

In some embodiments, the sensors detect at least GPS latitude and longitude, time of day, G Forces, low battery levels in OBD-connector device, disconnection of device from the OBD port as specified in the specification, weather information including temperature, humidity and barometric pressure.

In some embodiments, the communication unit consists of the following modules: GPRS communication module, 3G communication module, 4G communication module, 5G communication module, random phase multiple access network communication module and a Bluetooth communication module.

In some embodiments, the communication unit preferably consists of random phase multiple access (RPMA) network communication module or cellular technology i.e. 3G, 4G, LTE or 5G communication network.

In some embodiments, the different recipients to which system communicates is at least one of following: nearby vehicles, governmental and other agencies, interested third parties, communicating infrastructure such as smart stoplights, street lights and personal devices.

In some embodiments, the audio unit which generates alarms and alerts directed by processing unit can be connected via Bluetooth to personal devices in vehicle including mobile phones and vehicle's infotainment system.

In some embodiments, a method of allowing a user to monitor his vehicle's status comprises: collecting data from vehicle's information database in real time with help of OBD connector device and in-vehicle sensors; feeding the above data into a computerized processing unit; and generating an appropriate alerts or messages to user in real time via RPMA Random Phase Multiple Access Network communication unit or cellular technology, i.e. 3G, 4G, LTE or 5G network about vehicle's and driver's compliance with traffic regulations as well as current vehicle's mechanical condition.

In some embodiments, the vehicle's information can also be transmitted to a law enforcement agency if vehicle's non-compliance with traffic regulations and mechanical conditions is alleviated and not in a fixed timely manner and/or driver behavior performance condition as described in the specification.

In some embodiments, the vehicle's information database comprises at least one of the following information: vehicle's speed, acceleration, deceleration, driver's seat belt connection detection, engine and operational parameters including oil level, temperature, fuel, other fluid & water levels, light status (internal and external), tire pressures, filter status, potential leaks, wiper status, indicators, "idiot-light"-(a warning light that goes on when a fault occurs in a device) status, turning force, number of passengers, cruise control system status, and lane departure warning.

In some embodiments, a system of planning different geo-fencing regime corresponding to different drivers comprises: RPMA communication unit identifying a vehicle's driver; an OBD-connector collecting vehicle driving route information; and a processing unit with an Intelligence Artificial Intelligence solution as well as a GPS unit to establish a geo-fence corresponding to the driver.
In some embodiments, the system generates alerts if vehicle have driven outside of vehicle's associated geo-fence.

BRIEF DESCRIPTION OF DRAWINGS

The accompanying drawings illustrate the various embodiments of systems, methods, and other aspects of this disclosure. Any person with ordinary skill in the art will appreciate that the illustrated element boundaries (e.g., boxes, groups of boxes, charts or other shapes) in the figures represent one example of the boundaries. In some examples, one element may be designed as multiple elements, or multiple elements may be designed as one element. In some cases, an element shown as an internal component of one element may be implemented as an external component in another and vice versa. Further, the elements may not be drawn to scale.

Various embodiments will hereinafter be described in accordance with the attached drawing which is provided to illustrate and not to limit the scope in any manner.

DETAILED DESCRIPTION OF EMBODIMENTS

Figure 1A:
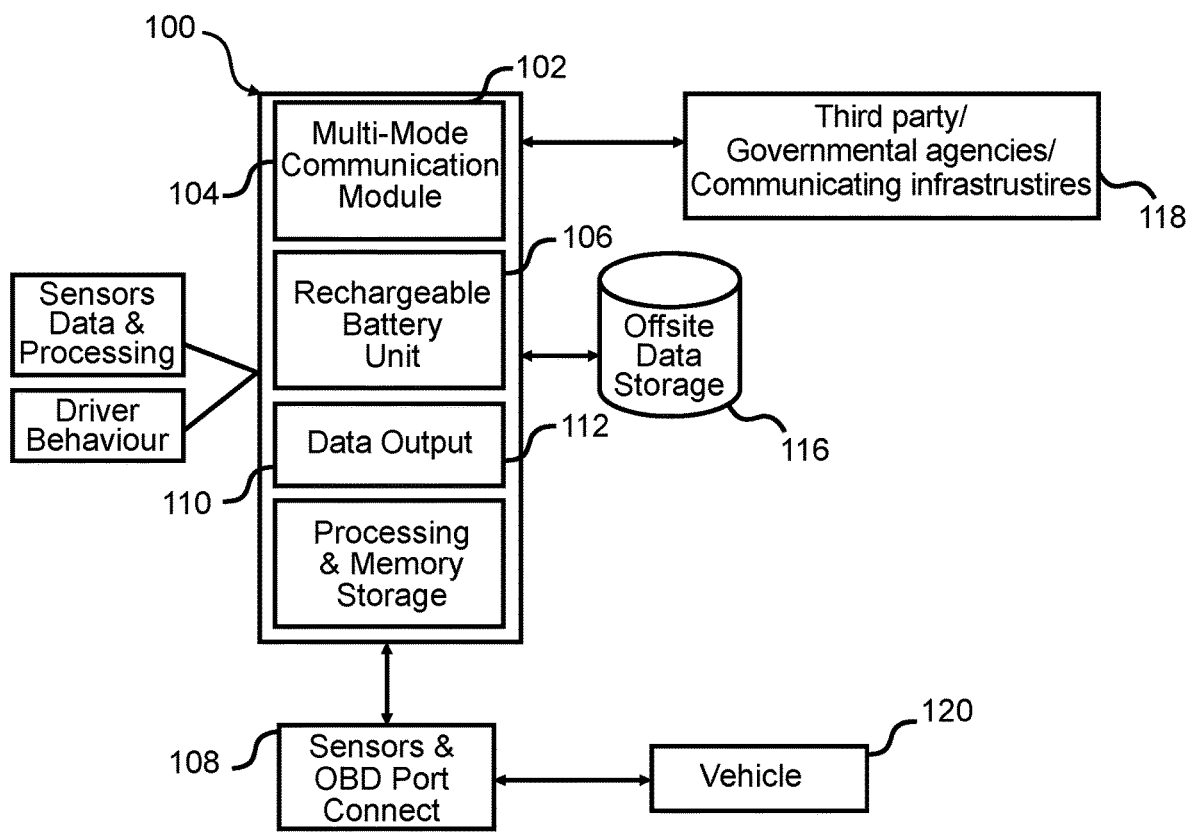
FIG. 1A illustrates a block diagram of the technical infrastructure to accomplish the functionalities of the present invention to utilize a LPWA wireless network i.e. Random Phase Multiple Access (RPMA) network and/or a cellular based network i.e. 3G/4G/LTE/5G to communicate vehicular status among other nearby vehicles, appropriate governmental agencies, third party service providers and communicating "smart" infrastructures, in accordance with at least one embodiment of the present invention.

The present disclosure is best understood with reference to the detailed drawing, use case, methodology and description set forth herein. Various embodiments are discussed below with reference to the FIG. 1A to FIG. 8 which is attached. However, those skilled in the art will readily appreciate that the detailed description given herein with respect to this figure are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

A person with ordinary skill in the art will appreciate that the systems, modules, and sub-modules have been illustrated and explained to serve as examples and should not be considered limiting in any manner. It will be further appreciated that the variants of the above-disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not is limited to the particular embodiment disclosed.

The invention also makes the vehicle part of an Internet of Things (IoT) network which connects the vehicle with the driver, with other nearby vehicles, with interested third-party organizations including law enforcement, and with communicating "smart" infrastructure to achieve the objectives such as speeding, seat belt positioning and geo fences features as mentioned in this specification.

The invention submits a unique On-Board Augmented Intelligence connector wherein the device communicates with external sensors installed in the vehicle ex: in ward facing camera or other sensor to analyze or report human behavior in detail. The sensor studies and reports drowsy driving, distracted driving, usage of mobile phones or other devices while driving. when the driver is recognized to be in one of these states the device plays an appropriate audio message to alert the driver to improve overall safety. The sensor can also be used to monitor the passengers in the vehicle and the device can generate appropriate alerts. Ex: report unattended kids/pets in the vehicle, monitor the count/entry/exit of children in a school bus.

The invention also presents a novel service called an E-call service, which is a service designed to provide quick response in case of emergency ex: a road accident The following below key points to be considered during the situation: —

Call button—The call can be made manually by vehicle occupants by pressing a button (the button is a part of the hardware)—or the call can be made automatically by the system if the car sensors detect that a serious accident has occurred.

Air-bag deployment—the air bag deployment status to be reported

Location & timestamp—the GPS location of the vehicle to be reported (lat & long)

Triggering mode—if the e-call was triggered automatically or manually

VIN, number plate and date-time stamp—associated vehicle identification number, or number plate details are to be reported Driver behavior analysis:—The present invention also submits the analysis report on the behavior of the Driver while driving the vehicle. The data processing unit analyzes the sensor data in light of received data to guide driver and understand the Driver's behavior such as phone usage, tired, and/or inattentive and/or distracted towards the goal. More particularly the infrastructure records the driver's behavior e.g. eye movement, acceleration, deceleration, and sudden braking etc, and overtime uses those data to distinguish between the other drivers and accordingly score the drivers behavior.

The present disclosure may be realized in hardware or a combination of hardware and software. The present disclosure may be realized in a centralized fashion, with intermediate, relay access points connecting to at least one computer system, or in a distributed fashion, where different central processing elements may be spread across several interconnected computer systems. A computer system or other apparatus adapted for carrying out the methods described herein may be suited. A combination of hardware and software may be a general-purpose computer system with a computer program that, when loaded and executed, may control the entire computer system such that it carries out the methods described herein. The present disclosure may be realized in hardware that comprises a portion of an integrated circuit that also performs other functions.

Detailed Description of the Embodiments—Use Case

The present invention submits the detailed description of various methodology used in system analysis to identify, clarify, and organize system requirements. The mentioned use case is made up of a set of possible sequences of interactions between systems and users in a particular environment and related to attend the goal of the invention.

The subject matter of the invention related to the Connected car use cases representation are divided into three categories as mentioned herein below:—Law enforcement system b) Insurance and user telematics system c) Others common to both groups d) Platform Reports and/or configurations and e) Driver behavior analysis The present disclosure submits following mentioned abbreviations used in order to achieve the outcome.

CC—connected car
DTC—Diagnostic trouble code
EVR—Emergency vehicle's route of travel
GPS—Global positioning system
Lat—Latitude
Long—Longitude
OBD—On-board diagnostics
PID—Parameter ID
UL—Upload
VIN—Vehicle identification number
VIS—Virtual impound system a) Law enforcement representation:—The present disclosure has been described with reference to the Law Enforcement demonstration. The person skilled in the art will appreciate that this particular instance is designed for the police/law enforcing authority. The disclosure submits following facts to clarify the understanding of the invention. The representation shall comprise speeding, seatbelt positioning and geo fences features which are being elaborately mentioned hereto.

a.1) Speeding

Database—The connected car device shall have in memory the entire speed database of all of the roads within the Specified Coverage Area. For purposes of Device Testing, other speed databases may also need to be loaded.

Speed Analysis—The connected car device shall measure the actual OBD speed and, with reference to the internal speed database, shall compare this with the speed limit associated with the section of road on which the vehicle is traveling.

Audio Message—The Device shall play a warning audio message if the vehicle speed is over the speed limit and under speed as well, this alert shall be triggered if the vehicle speed crosses (specified speed limit+grace speed value) or goes below the minimum speed The grace value is configurable from the back-end.

Configuration—If the vehicle keeps speeding over the (specified speed limit+grace speed value), the Device will play a warning audio alert for a configurable number of times before issuing a penalty (the time interval between each warning played should be configurable).

If the vehicle reduces the speed, going below the speed limit before a penalty is issued, the warning counter resets.

Penalty—IF the vehicle keeps over-speeding after a certain number of consecutive warning audio messages, a penalty audio message is communicated to the driver and an UL infringement message is sent through the network. The UL message will include:

Node ID of the Device
Timestamp of infringement
Location (lat & long)
Actual vehicle speed The device will store the infringement in a local cache/memory and send out the UL message as the network is available. Appropriate fines will be issued for each penalty received.

GPS reporting—Default input to capture Speed will be OBD II reading, Speed from GPS will be captured and reported as back-up and used for comparison purpose only. Speed will be recorded and delivered as part of the data package requirement for live tracking and monitoring of vehicles by Authorities. Frequency of GPS data capture is configurable.

a.2) Seatbelt

Seatbelt Analysis—The Device will read the driver seatbelt PID through the OBD-II port. If the vehicle is moving faster than a certain threshold speed (e.g. 10 km/h, this speed is customizable), the driver's seatbelt should be securely fastened.

Audio Message—IF the vehicle speed exceeds the threshold speed and the driver's seatbelt is not fastened, a warning audio message will be played to the driver. This process will repeat a few times before a penalty is received (the number of warnings before a penalty and the interval between each warning is configurable). If the seatbelt is unbuckled and the vehicle comes to halt before a penalty is issued the warning counter will reset Penalty—IF the driver does not fasten the seatbelt after consecutive warning audio messages, a penalty audio message is communicated to the driver and an UL infringement message is sent through the network. The UL message will include:

Node ID of the Device
Timestamp of the infringement
Location (lat & long)
Speed
Seatbelt status Penalty system will be configurable (one penalty per trip, or penalties are issued until the seatbelt is fastened). The device will store the infringement in a local cash/memory and send out the UL message as the network is available. Appropriate fines to be issued for each penalty received.

a.3) Geo Fences

The definition says that the Geo fences is a feature in a software program that uses the global positioning system (GPS) or radio frequency identification (RFID) to define geographical boundaries. Geo-fencing allows an administrator to set up triggers so when a device enters (or exits) the boundaries defined by the administrator, an alert is issued.

They are being categorized into two types i) static geofences and ii) dynamic geofences, the present disclosure defines separately in the following manner: — i) Static geofences

Static speed limits loaded in the devices will be same as actual speed limits (or configurable with a grace value)

Option to limit the geofence to one direction in a two-way road

Static geofences will work accurately even when off-roading ii) Dynamic geofences Dynamic geo-fence means customized requirements for specific roads or sections of roads, which can change under control of the backend Application Software. Dynamic geo-fences can be polygonal or linear and are used to set flexible boundaries and speed limits in situations of fog, slippery roads, road congestion, construction, accidents and other hazard conditions.

Configuration—A dynamic geo-fence shall be set with a starting and ending date & time and with an associated speeding logic. A set of dynamic geo-fences will be pre-set in the back-end platform, according to Police's requests. The speeding logic shall be set in one of two ways (both options shall be available) as follows:

The speed limit is set manually, from the backend Application Software

The speed limit is reduced by a certain % of the current static geo-fence speed limit, from the backend Application Software Dynamic geo-fences over-ride the static geo-fences during the time when these are active.

Linear dynamic geo-fence: This shall be set from point A to point B on a road direction basis, by the backend Application Software Polygonal dynamic geo-fence: This shall be set as a polygonal area, by the back-end Application Software. The back-end should have the ability to publish dynamic geofences exclusively to one single device or a group of devices Audio Message—When a vehicle enters or leaves a dynamic geo-fence, an audio alert shall be played to the driver. The audio alert shall communicate the dynamic speed reduction when playing the warning audio message.

A dynamic geo-fence can be cleared and/or updated prior its expiration date & time by the back-office platform. For instance: fog or accident can be cleared prior the original dynamic geo-fence settings, or construction work on an area can last longer than originally planned. The cleared and/or updated dynamic geo-fence shall be sent to the devices as a DL message.

Speed Analysis—The Device shall measure the actual OBD speed and compare it with the dynamic speed limit associated to that road.

The Device shall play a warning audio message if the vehicle speed is over the dynamic speed limit.

If the vehicle keeps speeding over the dynamic speed limit, the Device shall play the warning audio alert for a certain number of times before a penalty is issued. (the number of warnings before a penalty and the interval between each warning is configurable). IF the vehicle reduces speed below the dynamic speed limit before a penalty is issued the warning counter resets.

Penalty—If the vehicle keeps over-speeding after the consecutive warning audio messages, a penalty audio message is communicated to the driver and an UL infringement message is sent through the network. The UL message will include:
  Node ID of the Device
  Timestamp of the infringement
  Location
  Actual vehicle speed The device will store the infringement in a local cash/memory and send out the UL message as the network is available.

The UL message will be received to all the connected devices and shall be sent to the other devices as soon as these connect.

Further to this Dynamic geofences can be used for two important demonstration and those are:—i) Virtual impound system (VIS) ii) Emergency vehicle's route of travel The present invention elaborates Virtual impound system (VIS) and Emergency vehicle's route of travel in the following paragraphs: —

Virtual Impound System (VIS)

The location of the vehicle to be impounded can be the police premises, an impound yard or the drivers own garage.

Configuration—A geo-fence shall be set with a starting and ending date & time in the assigned impound area for a specific vehicle with the installed OBD Device/Dongle. Back end to be capable of publishing the impound geofence to a particular vehicle or a group of vehicles. The duration for which the vehicle was outside the impound geofence to be recorded.

Infringement Message—If the vehicle leaves the assigned impound geo-fence, a warning audio message shall be played to the driver. This process shall repeat few times before a penalty is issued (number of warnings before a penalty and interval between each penalty will be configurable) when a penalty audio message is communicated to the driver, an UL infringement message is sent through the network. The UL message shall include:
  Node ID of the Device
  Timestamp of the infringement
  Location (lat & long)
  Vehicle speed If the vehicle returns inside the geofence after a certain period ex: 5 mins no penalty to be applied (duration to be configurable).

Connection—If the Device is disconnected from the OBD-II port, an UL message is sent through the network. The UL message shall include:
  Node ID of the Device
  Timestamp
  Location (lat & long)
  Device disconnection status If the device is plugged back after a certain time no penalty will be applied (time interval is configurable)

Low Battery—If the Device reaches a critical battery level (critical level is configurable), an audio message shall be played to the driver, and an UL message is sent through the network. The UL message shall include:
  Node ID of the Device
  Timestamp
  Location (lat & long)
  Device battery level status
  Location—If the control room would like to locate a specific vehicle that has been impounded, a search for the device MAC address which has be installed in the identified vehicle would then show the location of this device on the GIS Map.

Emergency Vehicle's Route of Travel (EVR)

This use case concentrates on alerting all the vehicles travelling in the route of the emergency vehicle (ambulance, police vehicle, fire truck etc.) the route of travel of the emergency vehicle is simulated by a linear dynamic geo-fence, with a specified direction of travel (i.e. a vector).

Audio Message—If the vehicle enters the emergency vehicle dynamic geo-fence, traveling in the same direction as the emergency vehicle, a warning audio message shall be played to the driver.

The warning audio message shall be played every minute, as long as the vehicle keeps travelling on the same route of travel and in the same direction.

The EVR geo-fence can be cleared and/or updated prior its expiration date & time by the back-office platform, in case a new route of travel has been set by the back-end or if the emergency vehicle takes longer or less to reach the scene. The cleared and/or updated dynamic geo-fence shall be sent to the devices as a UL message.

Infringement Notification—The emergency vehicle shall be equipped with a smart sensor on the dashboard, with the sensor pointing to the road (route of travel).

As the sensor detects a license plate traveling in front of the emergency vehicle, closer than e.g. 10 meters, for longer than i.e. 5 consecutive seconds (duration and distance is configurable), a 30 second video shall be recorded and sent via LTE to the back-end Application Software for manual review. The video record can be triggered even with a manual action.

a.4) Device Disconnection/Tamper Detection

Connection—If the Device is disconnected from the OBD-II port, an UL message is sent through the network. The UL message shall include:
  Node ID of the Device
  Timestamp
  Location (lat, long)
  Device disconnection status
  Device battery status The UL message shall be sent to the network as soon as possible.

a.5) Accident Alarms

Accident alarms are generated based on the G-force sensitivity.
  G-Force data is captured as part of the data package for threshold event reports.
  Data reporting will be on demand, when a threshold is triggered.
  Flexibility to adjust the G-force sensitivity (to avoid false alarms)

a.6) Black Points and Fines

Appropriate fines are applied for penalties received by drivers, and black points are assigned to drivers with penalties

- All fines to have appropriate currency associated with them and an option to configure it
- All fines displayed will be in accordance with the list provided by the authority (police)
- Flexibility to change the amount (associated with each fine)
- Flexibility to change the number of black points assigned for each penalty issued b) Insurance and User Telematics Representation The present invention submits that this particular set of connected car representation focus on the CC solution for Insurance companies and user telematics b.1) Speeding The invention use case says that the default input to capture Speed will be OBD II reading and thereto Speed from GPS will be captured and reported as back-up and used for comparison purpose. Below are a few key points to be considered for the process of recording and reporting speed:

- Vehicle speed to be uploaded on demand as part of the message contents for prioritized messages (speed warnings).
- Frequency of GPS data capture should be configurable.
- Avg speed data may be required to support heat map/congestion monitoring feature. Heat Mapping will require, Speed, Location, Time and date Stamp.

b.2) Sudden Acceleration

The invention mentions following are a few key points to consider while using the OBD board accelerometer data to report aggressive acceleration by the driver as part of the driver behavior use case.

- The data will be uploaded as part of the data required for threshold driven message packet. The message package will be stored on the device until UI interval.
- Measurement based on positive movement on X-axis b.3) Sudden Deceleration and Hard Braking The invention mentions following are a few key points to consider while using the OBD board accelerometer data to report aggressive deceleration or hard braking by the driver as part of the driver behavior use case.

- The data will be uploaded as part of the data required for threshold driven message packet. The message package will be stored on the device until UI interval.
- Measurement based on negative movement on X-Axis b.4) Sharp Turn and Quick Lane Change The present invention also mentions in order to report accurate sharp turns and quick lane change and the G-force data from the OBD board accelerometer is required.

- G-Force data needs to be captured as part of the data package for threshold event reports.
- Data reporting will be on demand, with the data package being stored on the device until UI interval.
- Flexibility to adjust the G-force sensitivity (to avoid false alarms)

b.5) Towing

The invention mentions that the alarms has to be generated when the vehicle is towed. Below are few key points to be considered.

- When the ignition is off but the vehicle is in motion, a towing alarm is to be generated
- Alarm to be generated only when there is movement after certain time interval after the ignition is turned off and this interval should be configurable b.6) MIL (Malfunction Indicator Light)

The invention mentions following below key points to be considered during malfunction indicator light

- Reset of MIL should only be done by authorized mechanic at time of service.
- The item has to be adjusted to reflect the information as described by the PID available.
- Monitor status since DTCs cleared (MIL Status and number of DTCs generated)
- Distance travelled with MTh on, and Time run with MTh on to be reported b.7) Engine Idle Time and Excessive RPMs The invention mentions following below key points to be considered during engine Idle time and excessive RPMs.

OBD PID HEX 64: Engine Percent Torque is used to calculate idling time and OBD PID HEX OC is used to calculate the Engine RPM

- When the vehicle is idle for more than a specified time interval an idling alarm to be generated
- The time interval after which idling alarm is reported needs to be configurable
- Threshold event report, to include time-date stamp and location.
- Event Report will be stored on system and uploaded at default UL interval.

b.8) Trip Duration and Length

The invention mentions following below key points to be considered during trip duration and length

- Default periodic upload of the trip duration and length
- Trip duration to be calculated based on CCM wake up time
- Trip length to be calculated based on GPS during CCM wake up time (in km)
- Ability to view trip duration and length for a specific duration (date and time filter)

b.9) Ignition On/Off

The invention mentions following below key points to be considered during Ignition On/Off

- Every time ignition is turned off or on an alert is to be generated
- The alert should have GPS co-ordinates associated
- The alert should have date-time stamp associated with it b.10) Engine Temperature and DTCs The invention submits that PID HEX 04 gives the Engine coolant temperature and PID HEX 5C gives the engine oil temperature.

Network. OBD II PID HEX 01 Monitor Status since DC Cleared includes MTh Status and number of DTCs The following below key points to be considered while monitoring engine temperature and DTCs (Diagnostic Trouble code)

- Alarm to be generated when the temperature reaches a specified level
- Threshold event report, to include time-date stamp and location b.11) Alarm Statistics and Fuel Consumption Report The invention submits that OBD II PID HEX 5E is used to calculate fuel consumption rate in Litre/hour. Alarm Statistics report to be compiled from data captured in data warehouse dbs.

The following below key points to be considered during concerned consumption report of the alarm statistics and fuel consumption

- Threshold event report, to include time-date stamp and location

The data will be uploaded as part of the data required for threshold driven message packet. The message package will be stored on the device until UI interval.

b.12) Passenger Presence and Seatbelt Detection

The invention submits that the Seatbelt warnings will be issued for passenger seatbelts, and number of passengers inside the vehicle.

Seatbelt data to be captured after a certain time interval when the ignition is on Seatbelt warnings to be issued only when the seatbelt is unbuckled and the vehicle is in motion Time interval between each warning to be configurable Passenger presence detection depends on vehicle make/model and year.

c) Other Use cases:—The present invention submits that this particular set of connected car representation comprise of the use cases common to both groups i.e. law enforcement and insurance/user telematics on.

c.1) Network

The invention explains that all devices should ideally join the network immediately upon installation (or after a few minutes).

The following below key points to be considered during the installation: —

Messages/alerts/alarms generated when the device was out of coverage area should be stored and uploaded once the network is available again Ability to store up to 50 k events in case of network loss All devices that are not under network coverage are to be reported (back-end should flag all devices that are not currently connected, devices to record periods of when device active but have no connection).

Device to be alerted once it is back under network coverage area (devices should display connection status on back-end e.g.:—Not Connected or Connected).

c.2) VIN (Vehicle Identification Number)

The inventor submits that the VIN data should be automatically read from OBD port once the device has been plugged in. The data has to be captured regardless of the vehicle's make/model or year of manufacture.

c.3) Location

Location services are important for vehicle tracking and monitoring the route of travel, below are a few key points to be considered Location data needs to be captured as part of the data package for threshold event reports. This will be on demand, with the data package being stored on the device until UI interval.

When the ignition is turned off the last reported location to be displayed with date and time stamp Option to track the route taken by the vehicle at a given time interval Location to be reported with date and time stamp when any alarm/infringement is made (latitude and longitude to be associated)

c.4) Date-time stamp

The following below key points to be considered during the process

Time/Date Stamp needs to be captured as part of the data package for threshold and law enforcement reports. This will be on demand driven by event trigger, with the data package being stored on the device until UI interval.

Time/Date Stamp to be associated with every message sent

Time/Date Stamp will be required for every line entry into the data warehouse.

GMT time will be used for time capture, conversion to local time zones will be configurable on the backend.

c.5) Low Battery

The invention also talks about the low battery situation the concerned device reaches a critical battery level (critical level to be configurable), an audio message shall be played to the driver, and an UL message is sent through the network. The UL message shall include the following:

Node ID of the Device

Timestamp

Location (lat, long)

Device battery level status

The UL message shall be sent to the network as soon as possible.

c.6) Navigation Information

The following below key points to be considered during the process: —

Option to navigate from a set starting point to the destination

Real-time traffic updates to be given to the driver c.7) Device Status

Periodic checks to be done on the device and any kind of anomalies reported c.8) Vehicle status Vehicle status information to be collected and reported periodically The following below key points to be considered during the process: —

Upload period of vehicle status should to be configurable (daily/hourly/weekly)

When the vehicle fuel level/battery level reaches a critical state the driver to be notified Critical level should be configurable c.9) E-call services The invention also presents an E-call service, which is a service designed to provide quick response in case of emergency ex: a road accident The following below key points to be considered during the situation: —

Call button—The call can be made manually by vehicle occupants by pressing a button (the button is a part of the hardware)—or the call can be made automatically by the system if the car sensors detect that a serious accident has occurred.

Air-bag deployment—the air bag deployment status to be reported

Location & timestamp—the GPS location of the vehicle to be reported (lat & long)

Triggering mode—if the e-call was triggered automatically or manually

VIN, number plate and date-time stamp—associated vehicle identification number, or number plate details are to be reported c.10 Driver behavior analysis:—The present invention also submits the analysis report on the behavior of the Driver while driving the vehicle. The data processing unit analyzes the sensor data in light of received data to guide driver and understand the Driver's behavior such as phone usage, tired, and/or inattentive and/or distracted towards the goal. More particularly the infrastructure records the driver's behavior e.g. eye movement, acceleration, deceleration, and sudden braking etc, and overtime uses those data to distinguish between the other drivers and accordingly score the drivers behavior.

d) Platform, Reports and Configurations

The present invention provides following consolidated report based on the requirements: —

Driver behavior report: a consolidated report based on the driving behavior of each driver is to be generated with analytics and an efficient scoring mechanism. The scoring mechanism is based on the number of alarms generated by the driver. The report should have the option to filter data on a daily/weekly/monthly basis. The report should be customizable for a group of vehicles or a particular fleet.

Economy report: the economy report is built on the fuel consumption and the distance covered by each vehicle. The driver is rated as economical or non-economical based on the report. The report should have the option to filter data on a daily/weekly/monthly basis. The report should be customizable for a group of vehicles or a particular fleet.

Location Tracking report: this report should generate the route taken by a particular vehicle at a certain time interval. The time interval can vary form one day to a week, based on the filter applied.

Law enforcement report: the law enforcement report should display the total number of infringements made per use case, number of penalties received, total fine and black points received. This information should be available per diver/per fleet and filtered on a daily/weekly/monthly basis (customizable).

Configurations

Lastly, the invention provides configured report as following: —

Configure black points and fines: authorized personnel should have the ability to configure the fines associated with each penalty and also the number of black points awarded per penalty from the platform.

Approve/Reject EVR videos: authorized personnel should have the ability to approve or reject the videos recorded during EVR, If the vehicle in question fails to make way for the emergency vehicle an appropriate fine/black point is awarded to the driver.

Objectives of Present Embodiments

The objective of the present invention is to provide a system and a method for two-way wireless communication of a vehicle's status from the vehicle to and from different entities which include the driver, other nearby vehicles, governmental and other agencies including law enforcement agencies, interested third parties and communicating infrastructure such as smart stoplights and street lights. The wireless communication component of the system is primarily based upon Random Phase Multiple Access (RPMA) technology, but also can utilize 3G/4G/LTE/5G cellular network communication and/or other low-power wide-area communication technology such as LoRa™, Lora WAN™, NB-IoT, Haystack, LTE-MTC, NB-Fi etc. RPMA technology is the preferred wireless communication technology, and the details of this technology are described below.

The present invention communicates vehicle status information using radio frequencies via RPMA module to fixed, intermediate, relay communication Access Points which are networked via landline or wirelessly network links to central computer servers owned or contracted by vehicle owners and/or by third-party service providers to deliver a number of the operational objectives described herein using the lowest cost of any similar service. The present invention is tied to the VIN and/or license plate for the vehicle.

The primary objective of the present invention is the improvement of driving safety for the driving public and the reduction of vehicular accidents. It accomplishes this goal by identifying any potential risks posed by the vehicle's driver or nearby vehicles. Specifically, the present invention issues Alarms and Alerts which are designed to improve driving safety and are triggered by the following:

Potential nearby risks
  emergency vehicle in vicinity
  traffic hazard is nearby such as an accident
  dangerous road conditions including road closure or school areas
  dangerous weather conditions such as fog, black ice or sand storm
  potential road congestion or traffic jam
  other potential nearby risks or incidents such as stranded vehicles Potential hazardous operation of the "Connected Car"
  driving too fast
  accelerating too rapidly
  zig-zagging between the lanes
  harsh braking
  cornering too fast
  disconnected driver seatbelt
  driving with underinflated tire(s)
  low fuel
  driving inappropriately when emergency service vehicle is nearby
  driving without headlights or other safety equipment during inclement weather
  driver may be fatigued
  vehicle just involved in a collision Potential vehicle/Device mechanical issues
  potentially dangerous mechanical issues exist
  potential upcoming maintenance issue
  low battery charge in Device Potential operational guidance
  Re-routing driver to save time
  vehicle has been driven outside of defined driver's geo-fence for both static or dynamic fence boundaries
  fine is about to be levied on driver if issue is not resolved quickly
  vehicle needing mechanical fixes to enhance safety.

The present invention also accomplishes a number of other goals beyond safety improvement including better controlling traffic flow and reducing congestion during normal driving and at accident sites or traffic jams.

A major secondary objective of the present invention is to provide law enforcement with a real-time view of drivers within their jurisdiction to identify potential driving infractions after the driver has been notified and given a chance to correct their driving behavior that potentially violates local laws. The system first notifies the driver about an infractions, giving them fair warning to modify their driving behavior, and, if not modified, the system provides a method for having the law enforcement agency to issue fines and black points. The present invention is able to give advance warning to drivers about issues such as road speed limits because these data and associated maps are downloaded via multicast or unicast and locally stored in the device as the vehicle travels down the road and are stored in a roll-over location memory storage.

A third objective of the present invention is to define different geo-fencing regime for different drivers in response to identification of driver and driver's vehicle route. The geo-fenced boundary can be calculated based on the driver for e.g. if a young driver is driving and his parent or guardian does not want him to drive in high traffic area or high crime area, then they can plan a geo-fenced boundary to these places corresponding to young driver's vehicle and whenever the young driver enters the geo-fence area, alarms or alerts will be generated to young driver and to parents as well. There can be other reasons also to establish geo-fenced boundaries for different drivers that could be weather conditions or crime sites or accident sites. Communicating with nearby infrastructure such as stoplights and street lights can also improve the driving experience by allowing this smart infrastructure to make smarter decisions. Two way communication with nearby infrastructure can trigger street lights to dim up and down, can provide automatic payment for e-parking systems or tolls, can purchase fuel at the gas station, can give access to traffic lights based on traffic and can provide other services triggered by nearby road infrastructures.

For the driver, the present invention notifies them in advance about traffic, road, and weather conditions which allows the driver to make appropriate course and driving corrections, and it notifies the vehicle owner about potential mechanical issues that can be easily and more cheaply resolved when identified early. Other benefits to the "Connected Car" driver include Provide keyless entry
Find vehicle quickly in crowded parking lot
Find nearest available parking or cheap fuel
Provide navigational status (trip length, duration, etc.)
Prepay e-Parking fees and tolls so no need to stop at toll booth
Reduce operational costs by promoting/facilitating ride sharing
Reduce insurance premiums as reward for "good driving"

Regarding mechanical issues, the present invention also benefits the driver by providing significant insight related to engine oil level, engine temperature, water levels, tire pressures, fuel levels, light status, filters performance, potential leakages, warning signals etc. and can be used to predict potential mechanical issues so as to avoid costly, last-minute repairs.

The present invention is a small form factor, stand-alone, two-way wireless communication device that is mounted on the vehicle and connected both wired and wirelessly to a number of other components. This mounting makes the vehicle a "Connected Car". The present invention includes these components the two-way wireless communication multi-mode module (preferably RPMA) i.e. 3G, 4G/LTE, 5G communication network,
a variety of in-vehicle sensors generating data, A major secondary objective of the present invention is to provide law enforcement with a real-time view of drivers within their jurisdiction to identify potential driving infractions after the driver has been notified and given a chance to correct their driving behavior that potentially violates local laws. The system first notifies the driver about an infractions, giving them fair warning to modify their driving behavior, and, if not modified, the system provides a method for having the law enforcement agency to issue fines and black points.

The invention submits a unique On-Board Augmented Intelligence connector wherein the device communicates with external sensors installed in the vehicle ex: in ward facing camera or other sensor to study human behavior in detail. The sensor studies and reports drowsy driving, distracted driving, usage of mobile phones or other devices while driving. when the driver is recognized to be in one of these states the device plays an appropriate audio message to alert the driver to improve overall safety. The sensor can also be used to monitor the passengers in the vehicle and the device can generate appropriate alerts. Ex: report unattended kids/pets in the vehicle, monitor the count/entry/exit of children in a school bus. More particularly the infrastructure records the driver's behavior e.g. eye movement, acceleration, deceleration, and sudden braking etc, and overtime uses those data to distinguish between the other drivers and accordingly score the drivers behavior.

a data processing unit to analyze sensor data in light of received data to guide driver and understand the driver behavior,
memory storage,
an audio unit,
a Bluetooth module to communicate with smart phone/tablet,
anti tamper mechanism that prevents the unit from being opened,
a wired connection to the vehicle's OBD, and
a battery.

FIG. 1A provides a block diagram (100) of the technical infrastructure to accomplish the functionalities of the present invention which include these components. Each of these component blocks will be discussed in sequence.

Block 102—Communication Module Components. The key component in making the present invention to overcome the complexities that have plagued prior art is the Random Phase Multiple Access (RPMA) wireless communication network module which is composed of a number of components described below and which establishes a wireless connection between the vehicle and the other previously listed entities to achieve the objectives previously discussed. In an embodiment, a cellular based communication module (3G/4G/LTE/5G) or other low power wide area network communication system (LPWAN) can also be utilized to establish a two-way communication between the vehicle and other previously discussed entities.

Block 104—Multi-mode Communication Module. This component is the communication module that provides the wireless communication between the vehicle and the other previously discussed entities and is either RPMA communication module, or cellular based module.

The cellular based module, 104 is not limited to LPWA, 3G, 4G/LTE, 5G network technology and provides a solution for high-bandwidth applications of "connected car" vehicle.

The RPMA module 104 provides a low power Wide Area Network (LPWAN) having a wide geographic coverage and capacity for communicating with a large number of other modules, which allows for cost-effective connection in the license-free 2.4 GHz ISM band.

Further this RPMA communication conforms to ISO 15765-4 (CAN) specifications, and is encrypted via a 128 bit AES message encryption system to provide high levels of vehicle data security. 128-bit authentication is important as most technology encrypt the message, but the authentication keys are only 32 bit. The transmission uses a low latency and high coverage with a message frame of only 0.58 seconds, and fragmented in a maximum of 16 PDUs (Packet Data Units) per frame with each PDU containing 6 application payload bytes (plus a few additional bytes of overhead). Two radio antennas are used to increase spatial diversity and to speed communication transition from one Access Point (116) to another.

Communication is done infrequently, only when necessary, to reduce battery drain which is one of the complexities that plagued prior art, and the entire communication technology used by the present invention allows for a much wider geographical area to be covered. Finally, 100% of all messages communicated from the vehicle are acknowledged by the servers as successfully or unsuccessfully received which again reduces the number of transmission messages and potential battery drain.

As part of the communication module is also a Bluetooth radio that allows the present invention to be linked to in-vehicle personal communication devices such as smart phones, tablets or other devices with Bluetooth capability to communicate the vehicle related information.

Block 106—Battery Unit. The device 102 includes a rechargeable battery unit 106 which can be recharged by vehicle's battery via OBD-II port 108. Because of the special design of the RPMA Communications Module 104, battery life for a single vehicle can typically be 10 years or more.

Block 108—Onboard Sensors & OBD Port Connection. The present invention has two types of sensors, ones that are an integral part of the vehicle and another is connected to the vehicle's data via an Onboard Dash (OBD) connection to the vehicle's information database. The combination of these two sensor data is fed to the computerized processing unit of the present invention (112) which allows the user to monitor the vehicle's compliance with traffic regulations and current conditions as well as monitor the vehicle's mechanical condition and generate alarms and alerts as appropriate.

The OBD connection to the vehicle provides a variety of data for the present invention to improve driving safety including the vehicle's speed, acceleration, deceleration, wipers, indicators, "idiot-light" status, seatbelts, turning force, lights status (internal and external), number of passengers, cruise control system status, and lane departure warning among other information. The status of cruise control system notifies the vehicle operator about system inoperability and can perform cyclic check the possibility of cruise control function. The port connection provides the following maintenance data is related to the vehicle's mechanical condition including engine oil level, engine temperature, water levels, tire pressures, fuel levels, lights, filters, leakages, warning signals etc.

The built-in sensors in the present invention detect the GPS latitude and longitude, the time of day, G Forces on the vehicle, low battery levels in the present invention, disconnection of the present invention with the OBD port, weather information including temperature, humidity and barometric pressure as well as other local data.

Block 110—Data Output. The present invention contains a number of methods by which it can communicate alarms and alerts in real-time to the driver. Chief among these is an audio unit containing speakers and an amplifier and the ability for the driver to select either a male or female speaker. Audio responses are locally stored and can be downloaded to the present invention. The audio unit of the present invention can be connected to vehicle's audio system via Bluetooth. When the present invention is alerting using the audio system, it disables the other audio devices installed in the vehicle. Additionally the present invention can be connected via Bluetooth to any in-vehicle external displays such as iPad, fleet management displays and other in-vehicle displays output upon which a variety of status and alarm/alert messages can be displayed including a map of the vehicle's current location. The combination of these data output devices is designed to warn the user about potential risks.

Block 112—Sensor Data and Processing. The present invention contains a data processing unit that can take all of the sensor information, whether from the built-in sensors or the OBD port connection and analyze it to determine make appropriate recommendations to the vehicle driver. Potential operational guidance includes re-routing suggestions to save time, suggestions for safer driving, notification that vehicle has been driven outside of defined driver's geo-fence static or dynamic fence boundaries, and warning that a fine is about to be levied on the driver if one or more driving issue is not resolved quickly.

The present invention also contains vehicle-based memory storage that not only stores maps and locally relevant information for the vehicle's location but also stores all audio messages the system has generated, all alarms and alerts the system has produced, and the route and driving history of all recent trips.

Block 114—Driver Behavior:—The present invention also submits the analysis report on the behavior of the Driver while driving the vehicle. The data processing unit analyzes the sensor data in light of received data to guide driver and understand the Driver's behavior such as hard breaking, sudden acceleration, phone usage, tired, and/or inattentive and/or distracted towards the goal etc. More particularly the infrastructure records the driver's behavior e.g. eye movement, acceleration, deceleration, and sudden braking etc, and overtime uses those data to distinguish between the other drivers and accordingly score the drivers behavior.

Block 116—Off-Site Data Storage. The present invention provides for connection to and utilization of remote computer servers exterior to the vehicle. The same type of information stored in the vehicle can be stored offline outside the vehicle and full driving histories can be stored since storage is not limited offline the way it is in the memory located in the vehicle. The central server can also provide a number of other services such as providing firmware upgrades, maps, as well as additional applications (i.e. tracking feature, virtual toll gate, e-parking, etc.).

Block 118—Connection to Third Parties. A key component of the present invention is the ability to connect to and communicate securing in both directions with third parties and communicating infrastructures. The present invention communicates with these third-party service providers to provide them with the location and speed of the vehicle, usage of the driving to set appropriate insurance and other use charges, determine internal status of the vehicle (seatbelts, device's battery & connectivity, etc.), immediately notify emergency vehicles if vehicle is involved in an accident, notify concerned person if vehicle crosses its defined geo-fence boundaries, shut down vehicle if it is stolen or is being driving inappropriately, and impound vehicle for variety of reasons (late payment, unpaid fines, etc.). Other information may be communicated to these third parties as determined by the parties.

The connection between the vehicle (118) and these third party computer servers (116) are via intermediate Access Points which create the wireless communication link with the vehicle and then create a wireline or wireless networked connection to one or more remote computer server (116) operated by some third-party who is approved to receive this information. The network is scalable by adding more Access Points (AP), which can increase the number of vehicles that can be handled in a specific area, expand the geographical coverage area, or add customized services. The RPMA-based communication technology uses less infrastructure compare to cellular networks, and has been reliability proven in various geographical region when the RPMA technology has been implemented in multiple projects (i.e. WellAware, N. V. Elmar, CEPM, etc.).

Figure 1B:
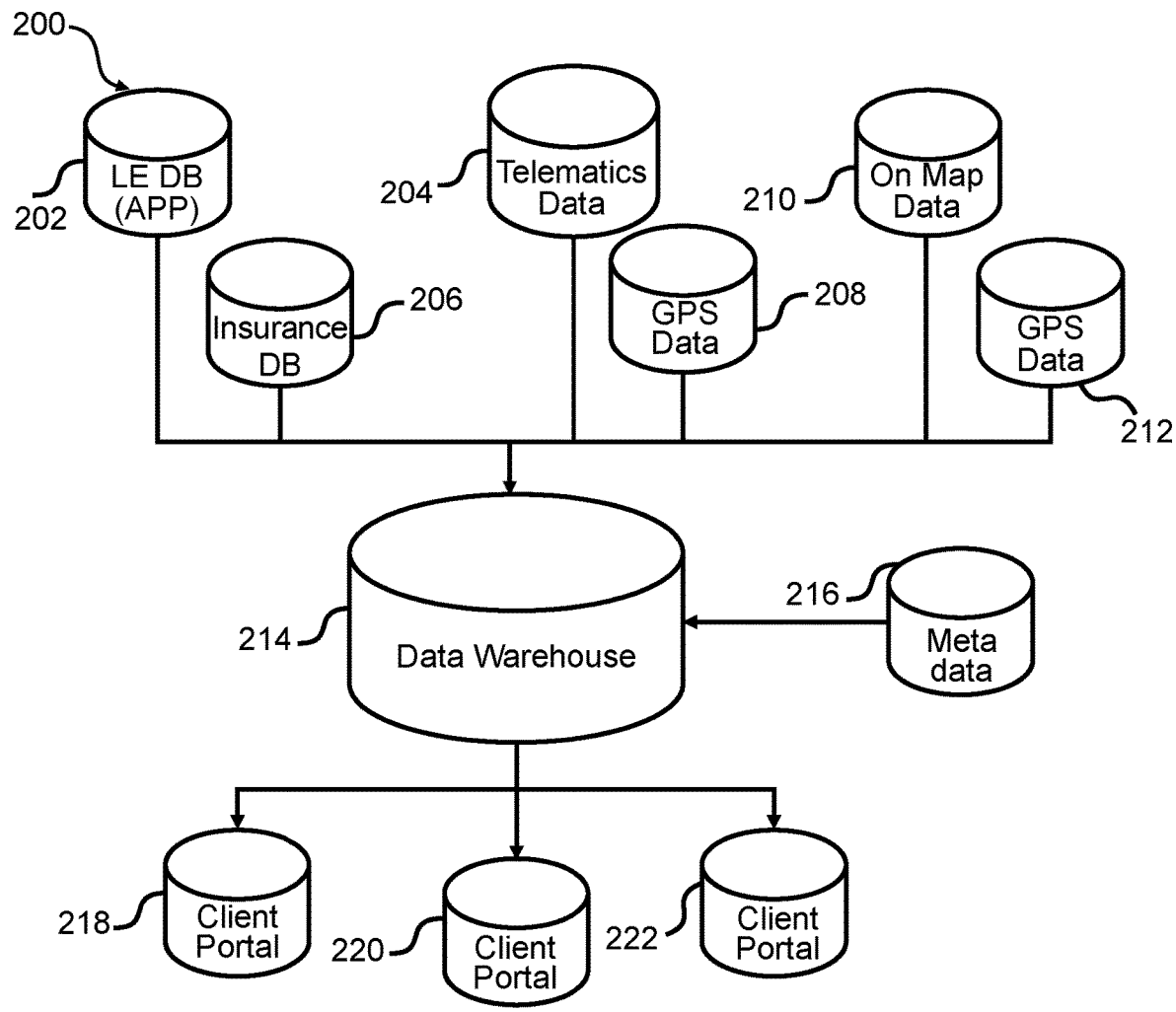
FIG. 1B describes the complete infrastructure to accomplish the functionalities of the present invention to utilize a LPWA wireless network i.e. Random Phase Multiple Access (RPMA) network and/or a cellular based network i.e. 3G/4G/LTE/5G to communicate vehicular status among other nearby vehicles, appropriate governmental agencies, third party service providers and communicating "smart" infrastructures, in accordance with at least one embodiment of the present invention.

FIG. 1B describes the complete infrastructure to accomplish the functionalities of the present invention to utilize a LPWA wireless network i.e. Random Phase Multiple Access (RPMA) network and/or a cellular based network i.e. 3G/4G/LTE/5G to communicate vehicular status among other nearby vehicles, appropriate governmental agencies, third party service providers and communicating "smart" infrastructures, in accordance with at least one embodiment of the present invention.

Figure 2A:
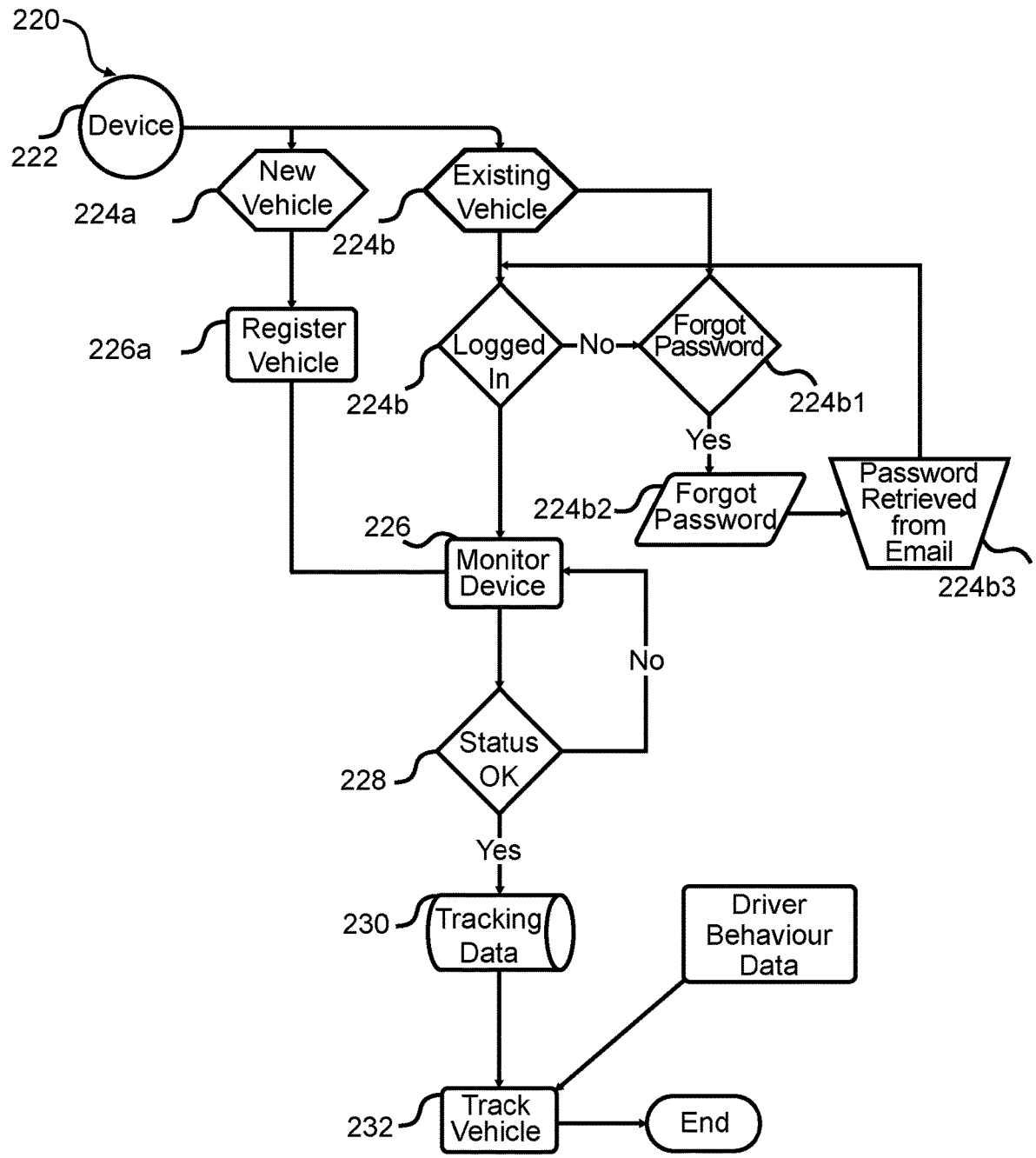
FIG. 2A illustrates the overall process in form of flow chart which comprises for tracking vehicle in accordance with at least one embodiment of the present invention.

FIG. 2A illustrates the overall process comprise for tracking vehicle in accordance with at least one embodiment of the present invention. The current figure displays the platform flow to track a particular vehicle of interest. Similarly, a group of vehicles or a whole fleet can be tracked at a given time with accurate longitude and lattitude. The tracking flow chart describes a device 222 comprising a new vehicle 224 (a), Register vehicle 226(a) and existing vehicle 224 (b), if the path is following through existing vehicle 224 (b), there upon logged in 224 (b), and in case a person forgets his password 224 (b1), 224 (b2), there is a system for retrieving password 224 (b3). The figure then demonstrates how to monitor device 226, and also to know the status of the device 222, thereupon knowing the status track data 230 and finally track the vehicle 232. The embodiment thus describes process for tracking vehicle in accordance with at least one embodiment of the present invention.

Figure 2B:
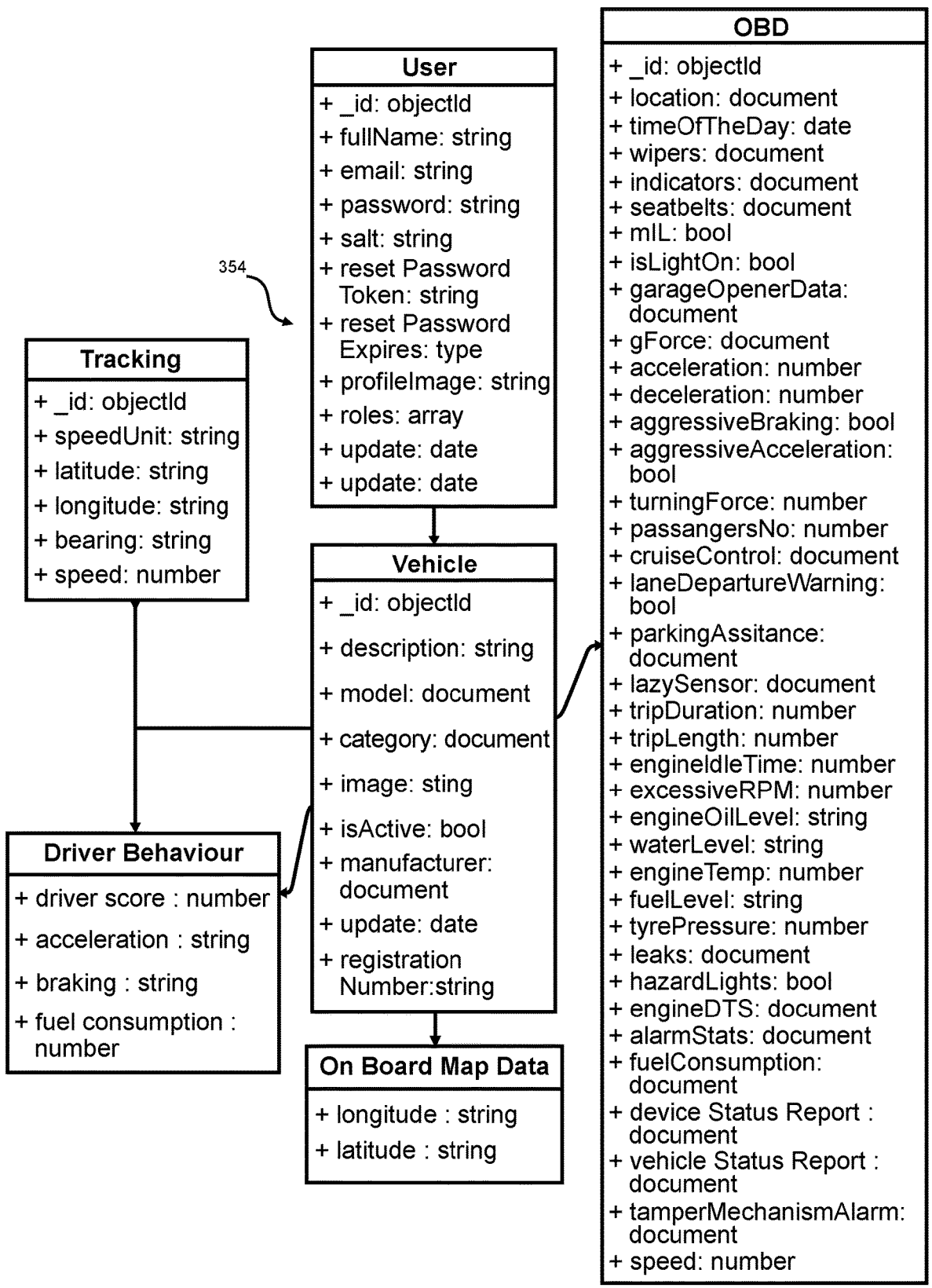
FIG. 2B represents the entire system class diagram to communicate vehicular status among other nearby vehicles, appropriate governmental agencies, third party service providers and communicating "smart" infrastructures, in accordance with at least one embodiment of the present invention.

FIG. 2B represents the entire system class diagram to communicate vehicular status among other nearby vehicles, appropriate governmental agencies, third party service providers and communicating "smart" infrastructures, in accordance with at least one embodiment of the present invention.

Figure 3:
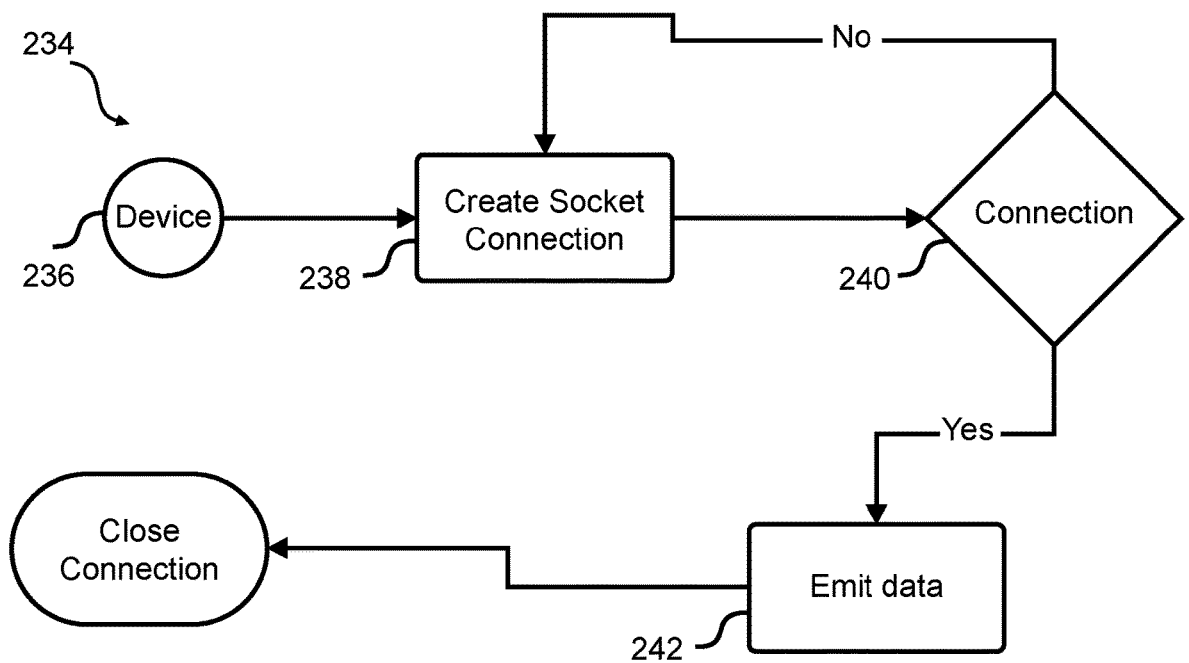
FIG. 3 depicts the functionalities behind the Socket connection (TCP) process in a step wise method in accordance with one described embodiment.

FIG. 3 depicts the functionalities behind the Socket connection (TCP—Transmission Control Protocol) process in a step wise method in accordance with one described embodiment. The current figure depicts how connection 238 is established and data is transmitted from the device 236. The embodiment upon connection emits data 242 for the reference and record purpose. The embodiment thus describes process for functionalities behind the Socket connection (TCP) process in accordance with at least one embodiment of the present invention.

Figure 4A:
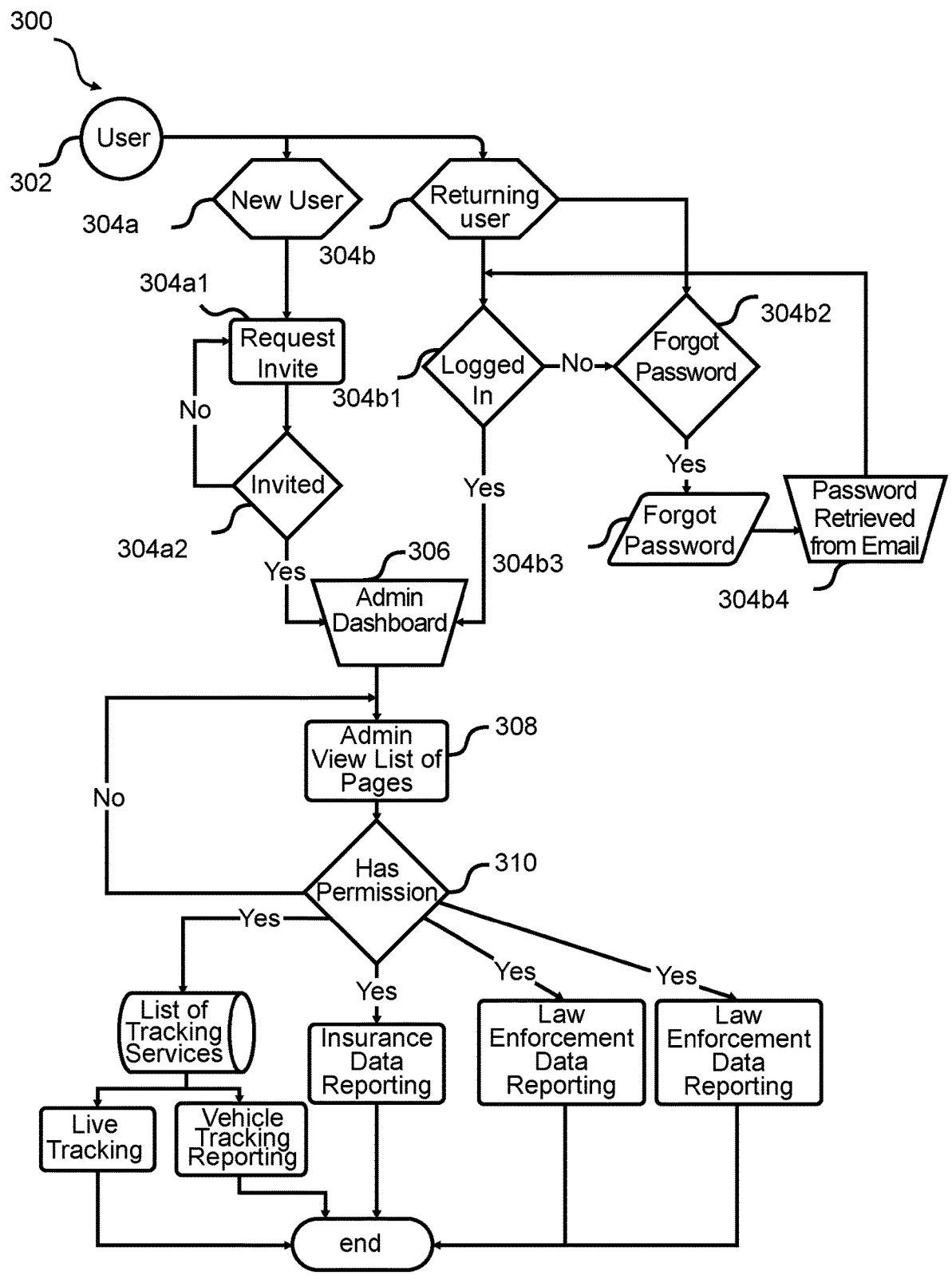
FIG. 4A demonstrates the flow diagram comprising procedures involved in backend user service as one of the embodiments of the present invention.

FIG. 4A demonstrates the flow diagram comprising procedures involved in backend user service as one of the embodiments of the present invention. And how data for different use cases is being reported hereto in the present embodiment. The embodiment describes a user 302, the user 302 covers new user 304 (a) and returning user 304 (b). There are sequential steps involved for the returning user 304 (b), in case the user forgets his password 304 (b2), 304 (b3), there is a system for retrieving password 304 (b4). Further to the illustration, the user request for invite 304 a1 and upon invitation 304 (a2), the user (300, 302) is connected to the admin dashboard 306, and there he can view the list of pages 308, and afterwards permitted to view list of tracking services, insurance data reporting and law enforcement data reporting. The embodiment thus describes procedures involved in backend user service in accordance with the illustrative embodiment hereto.

Figure 4B:
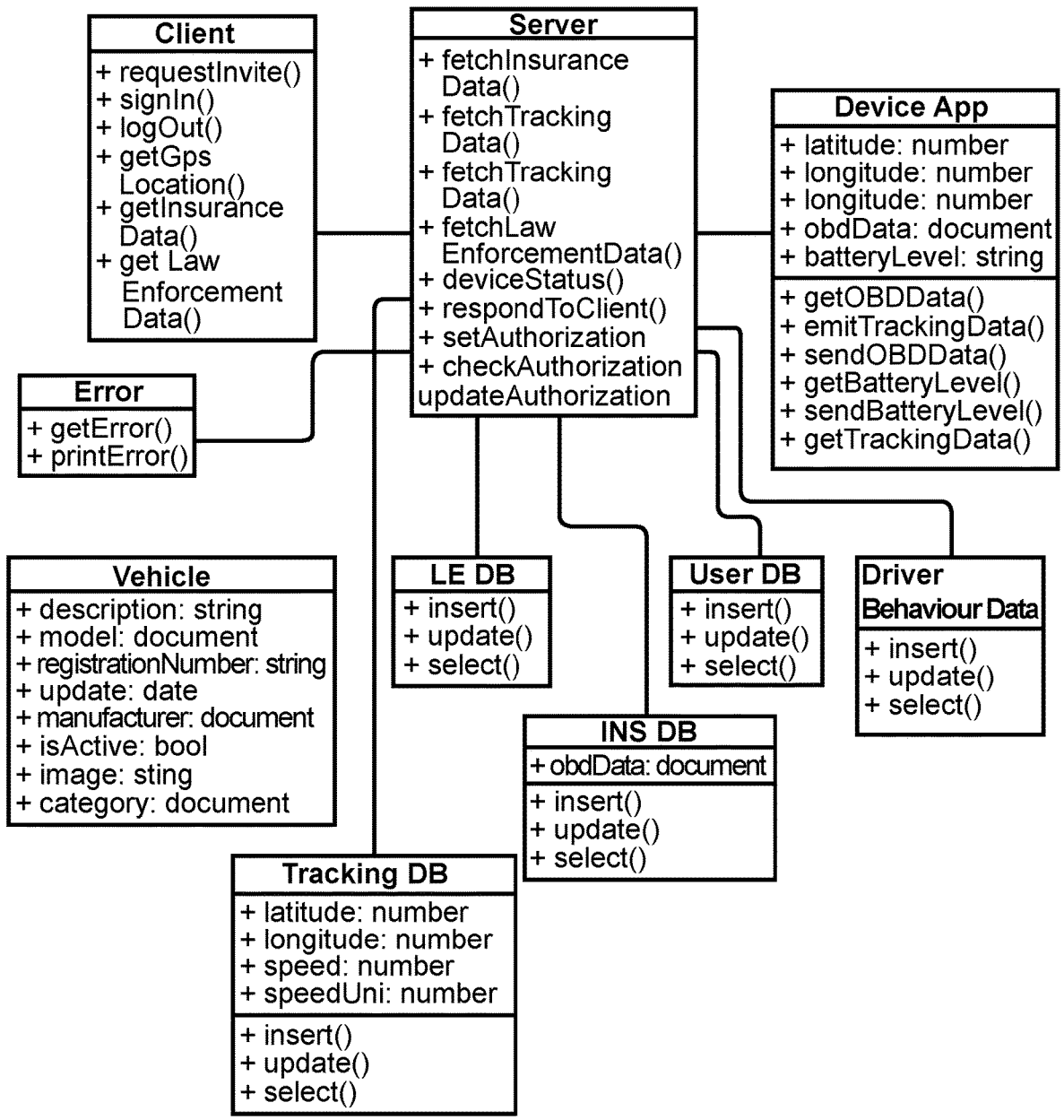
FIG. 4B represents the entire system class diagram for backend data user flow.

FIG. 4B represents the entire system class diagram for backend data user flow.

Figure 5A:
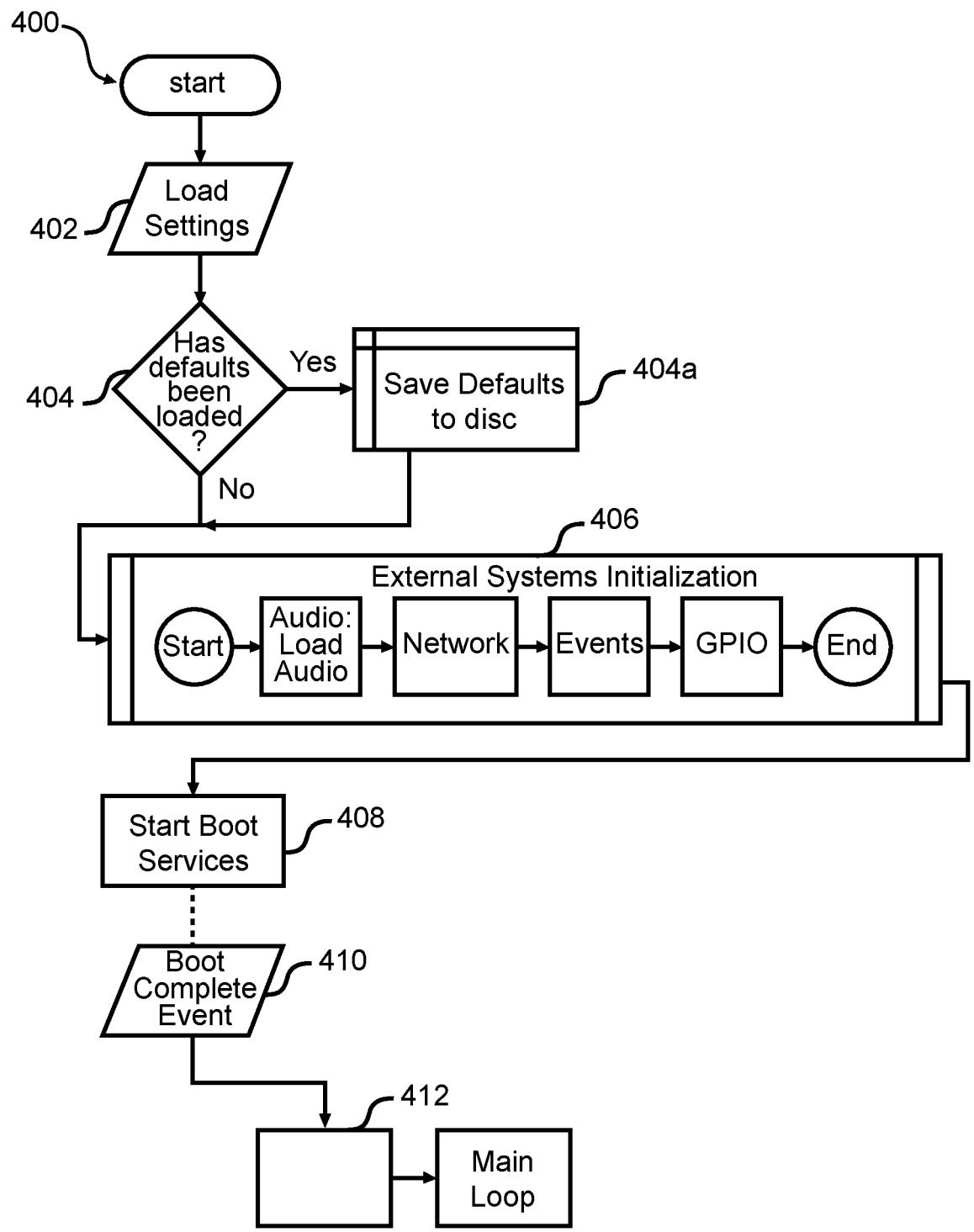
FIGS. 5A-B represent the flow diagram that describes process for initializing the complete system to communicate vehicular status among other nearby vehicles, appropriate governmental agencies, third party service providers and communicating "smart" infrastructures, in accordance with at least one embodiment of the present invention.
Figure 5B:
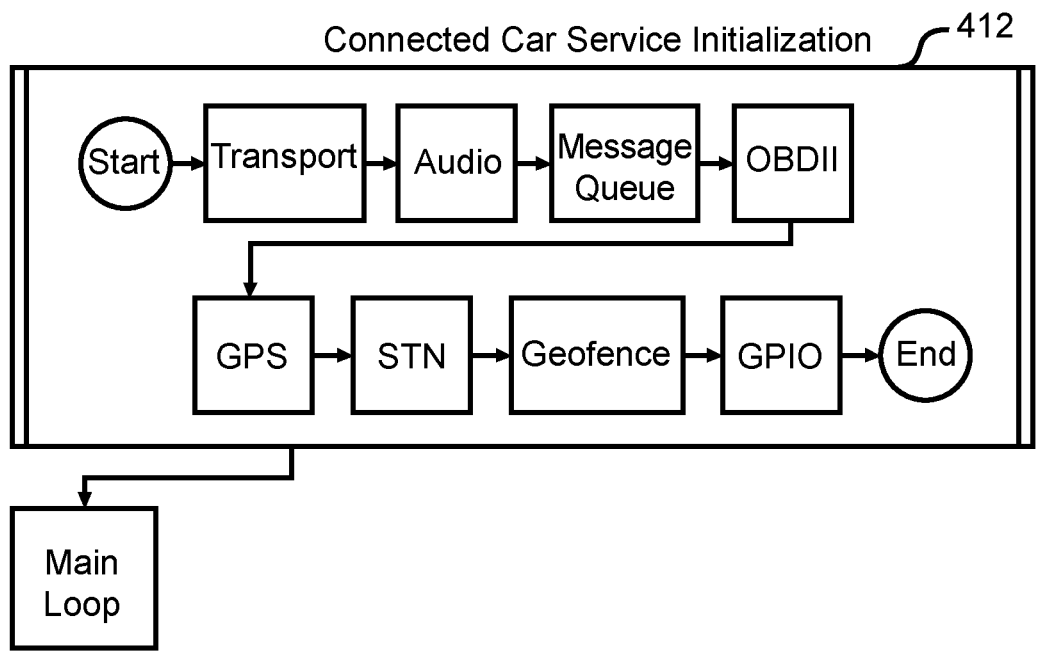
Figure 6A:
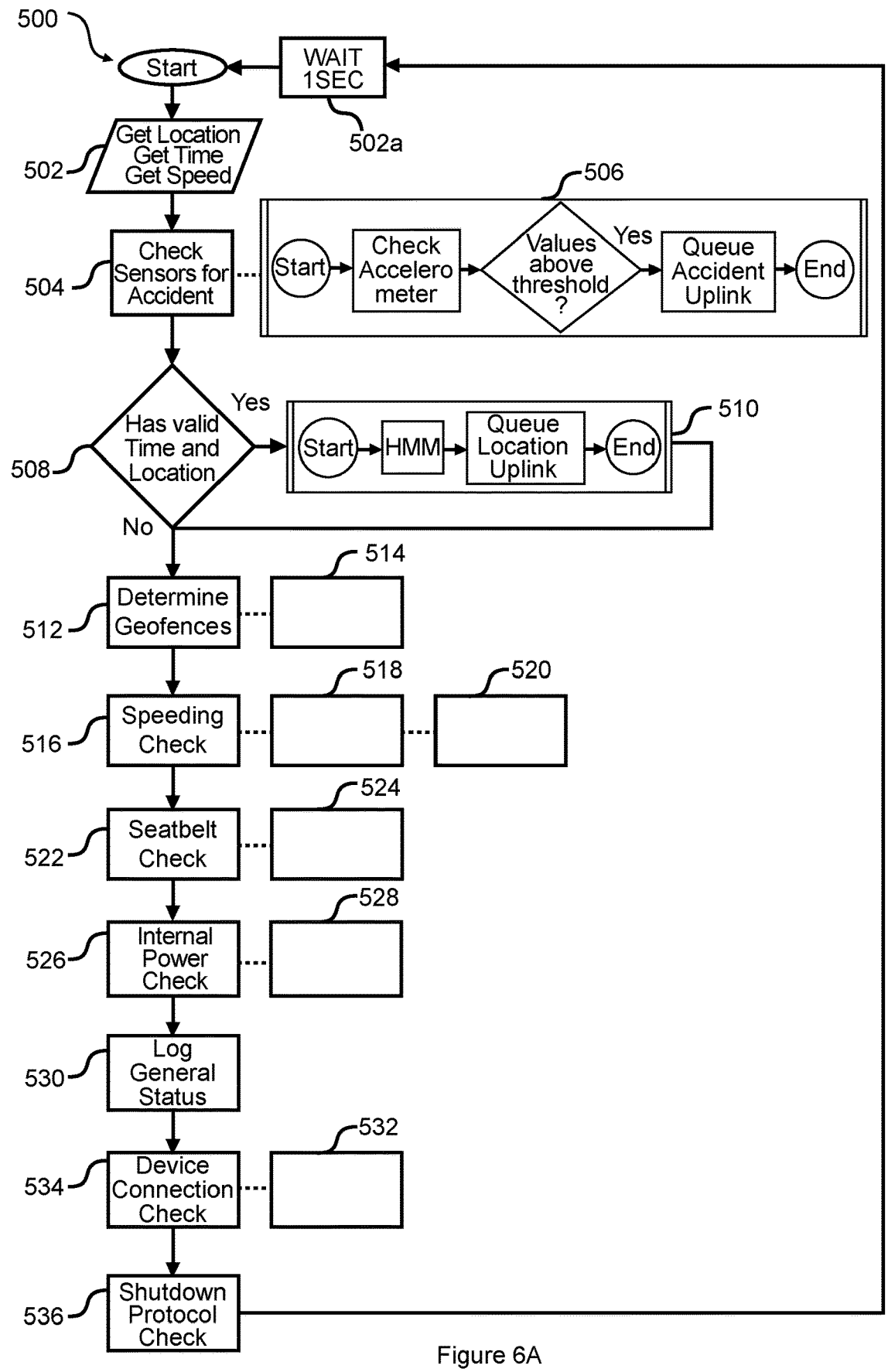
FIGS. 6A-F show the flow diagram that describes the steps involved in Law enforcement system specific to communicate vehicular status among other nearby vehicles, appropriate governmental agencies, third party service providers and communicating "smart" infrastructures, in accordance with at least one embodiment of the present invention.
Figure 6B:
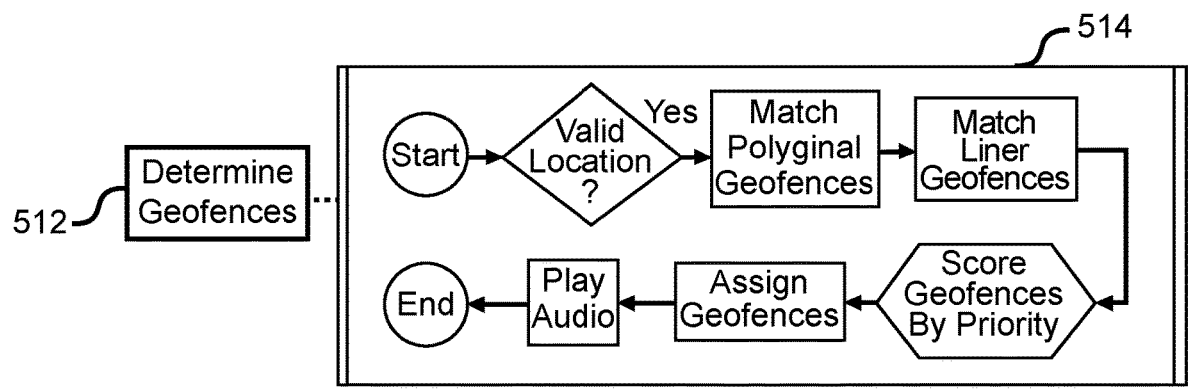
Figure 6C:
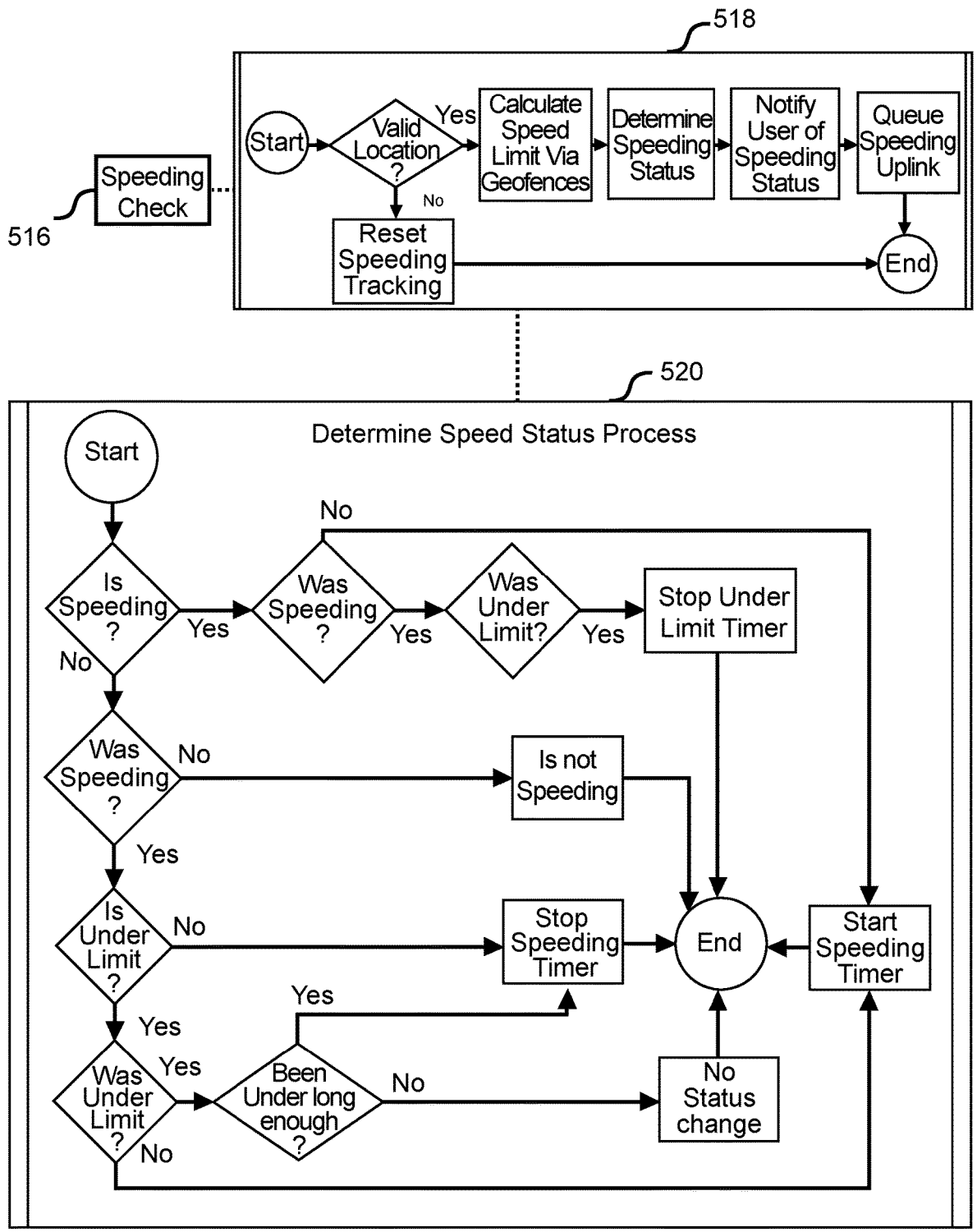
Figure 6D:
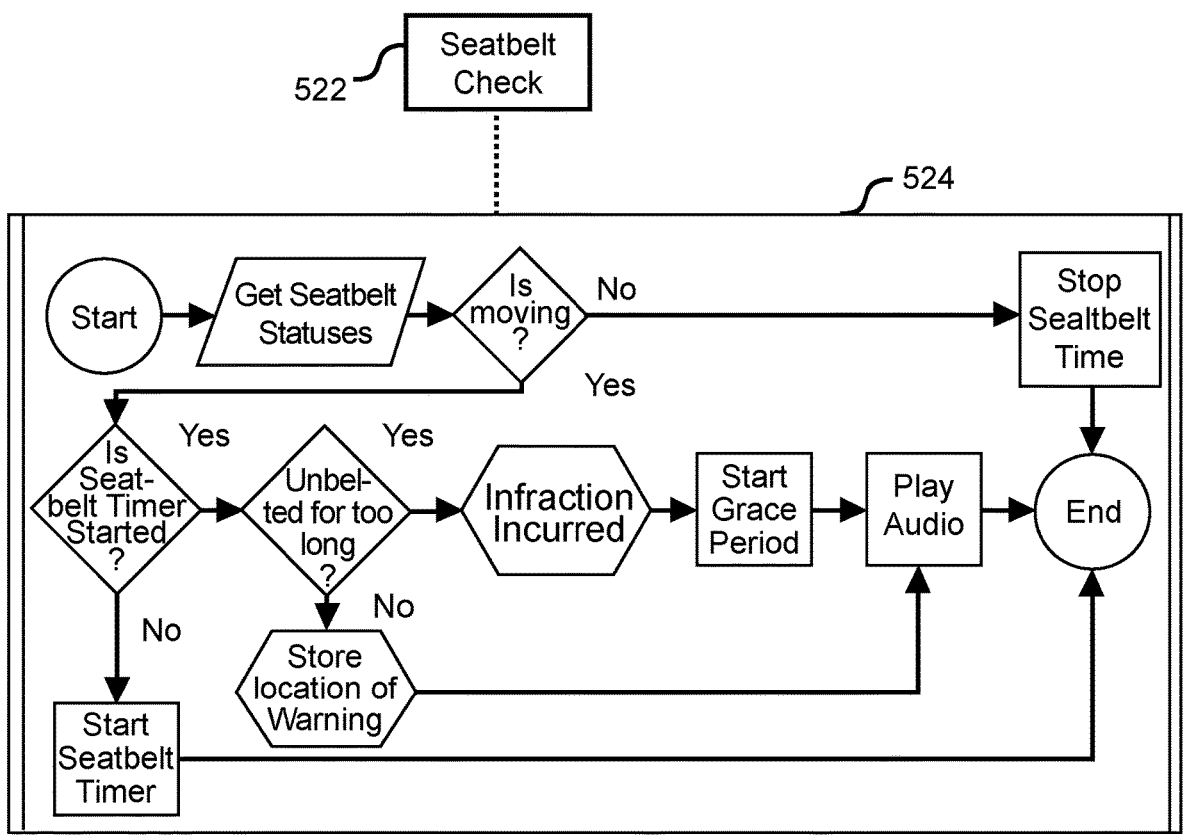
Figure 6E:
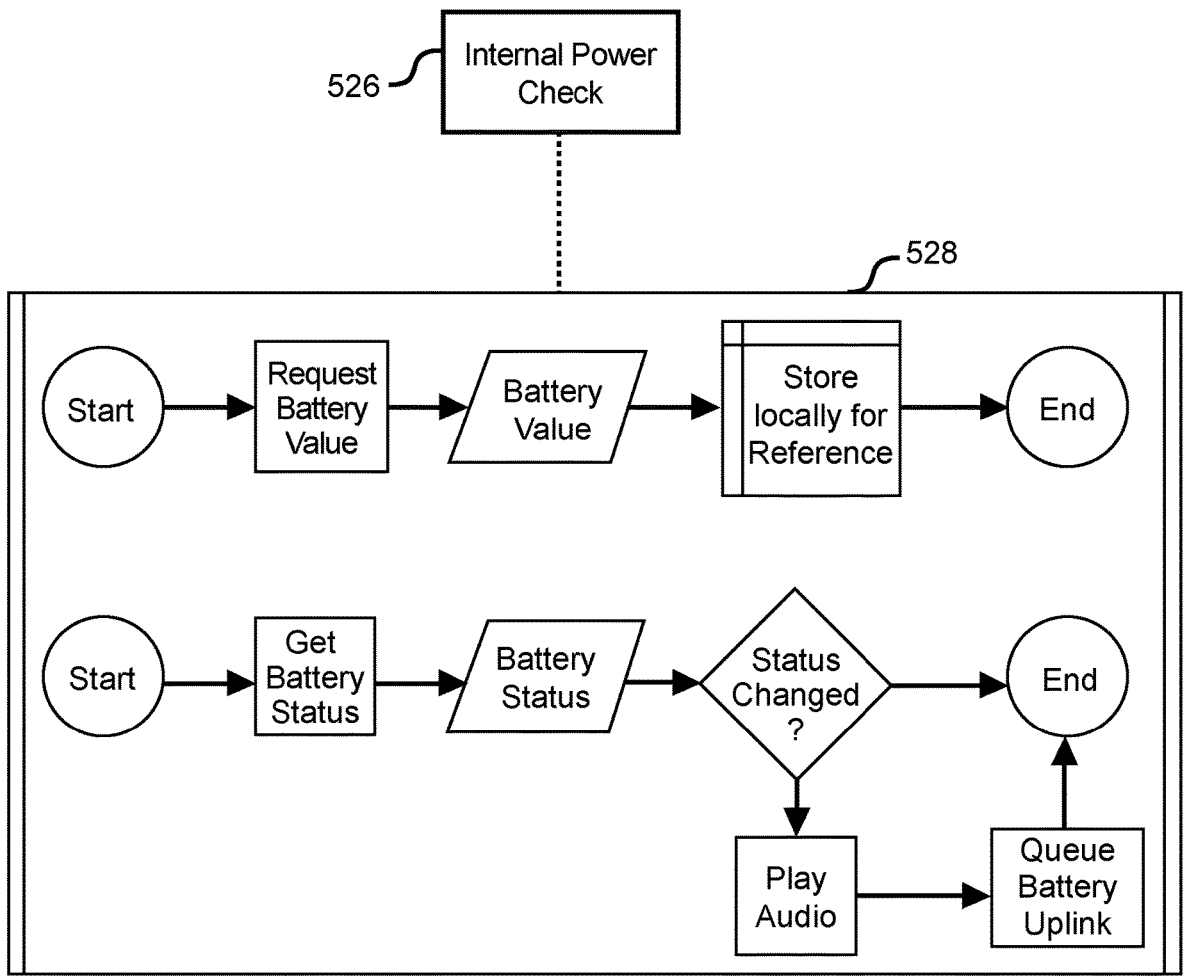
Figure 6F:
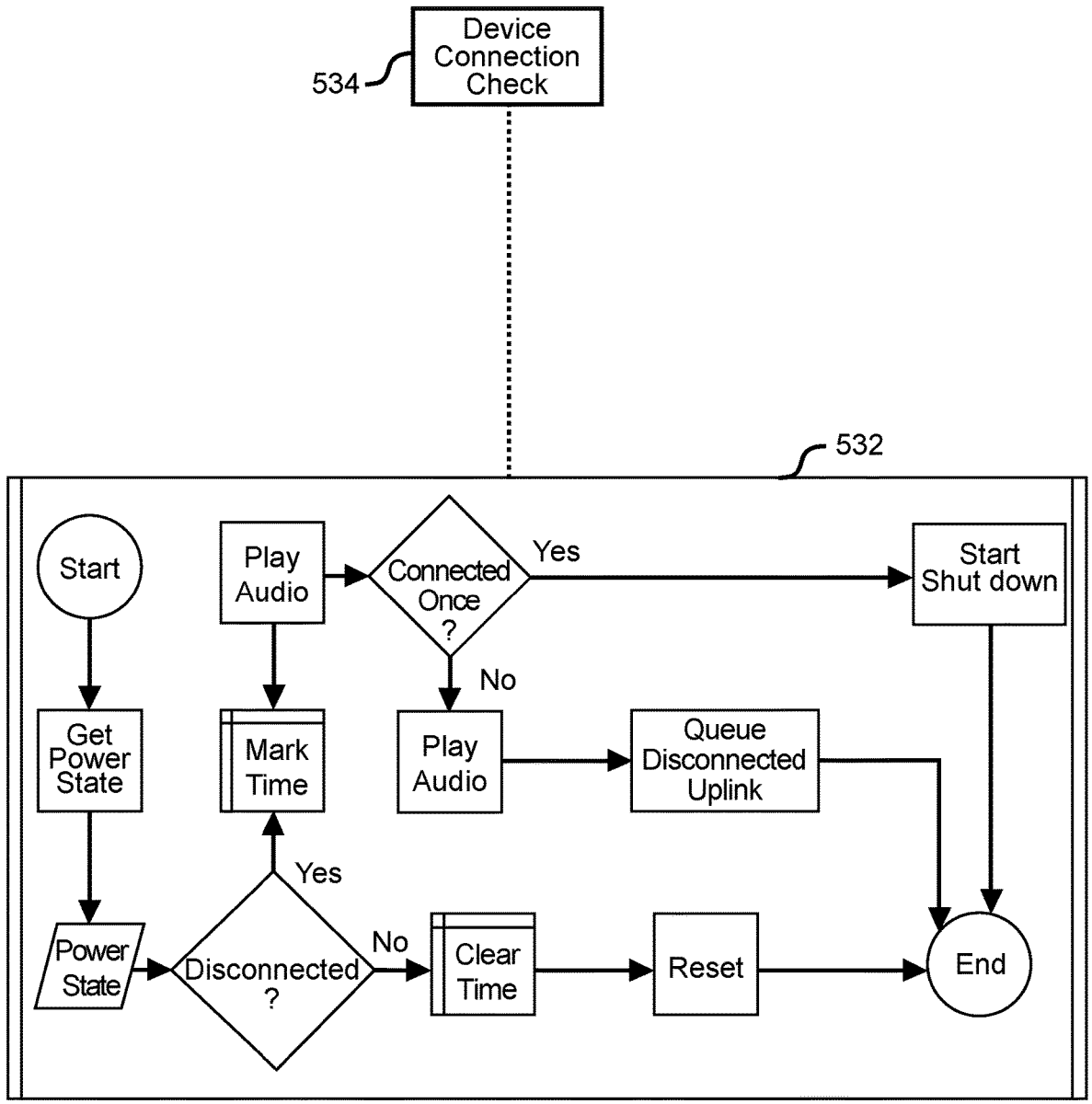

FIGS. 5-B represent the flow diagram that describes process for initializing the complete system to communicate vehicular status among other nearby vehicles, appropriate governmental agencies, third party service providers and communicating "smart" infrastructures, in accordance with at least one embodiment of the present invention. The embodiment is depicting an exemplary hierarchical flow structure that initiates the infrastructure from the device to the car, wherein the process is initiated with start 400, thereupon follow load settings 402, before external system initialization 406, need to check whether the defaults 404 like seatbelt positioning status has been loaded or not, if it is loaded save those defaults status to the disc 404 a, if not then restart the booting services 416, once the booting event is completed 418 finally connected car service is initiated 420. The embodiment thus describes process for initializing the complete system to communicate vehicular status among other nearby vehicles, appropriate governmental agencies, third party service providers and communicating "smart" infrastructures, in accordance with at least one embodiment of the present invention.

FIGS. 6A-F show the flow diagram that describes the steps involved in Law enforcement system specific to communicate vehicular status among other nearby vehicles, appropriate governmental agencies, third party service providers and communicating "smart" infrastructures, in accordance with at least one embodiment of the present invention. The present disclosure has been described with reference to the Law Enforcement demonstration. The person skilled in the art will appreciate that this particular instance is designed for the police/law enforcing authority. The disclosure submits following facts to clarify the understanding of the invention. The representation shall comprise getting location (502, 508), time (502, 508) and speed (502, 516) sensor for accident 504, seatbelt positioning 522, geo fences 512, internal power check 526, log general status 530, device connection check 534 & lastly shutdown protocol check 536 features which are being elaborately mentioned hereto in a stepwise flow structure for law enforcement system process. The embodiment is also depicting an exemplary hierarchical flow structure 520 how to determine speed status process in the system.

Figure 7A:
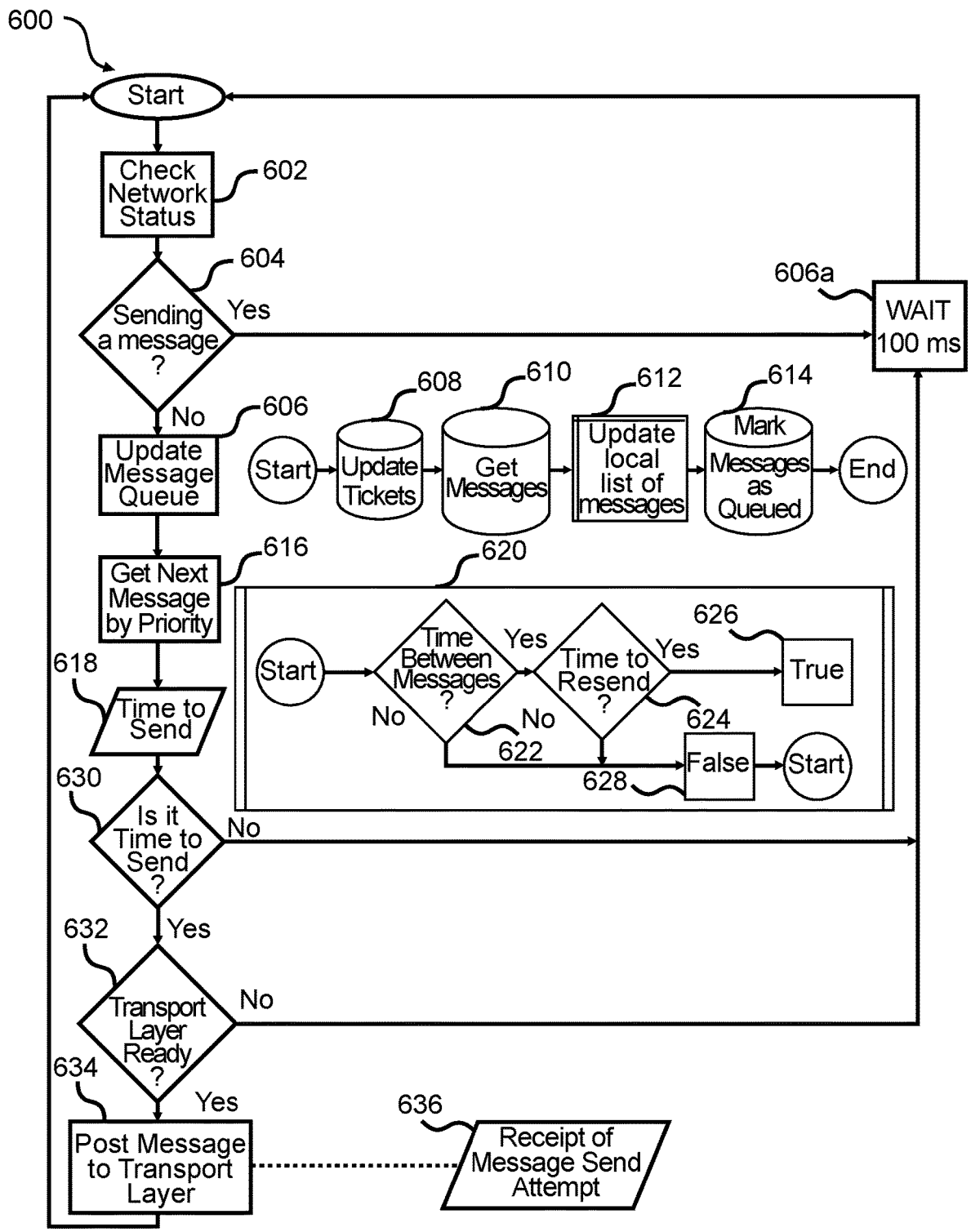
FIGS. 7A-B associate with flow diagram representation of device messaging in accordance with one described embodiment.
Figure 7B:
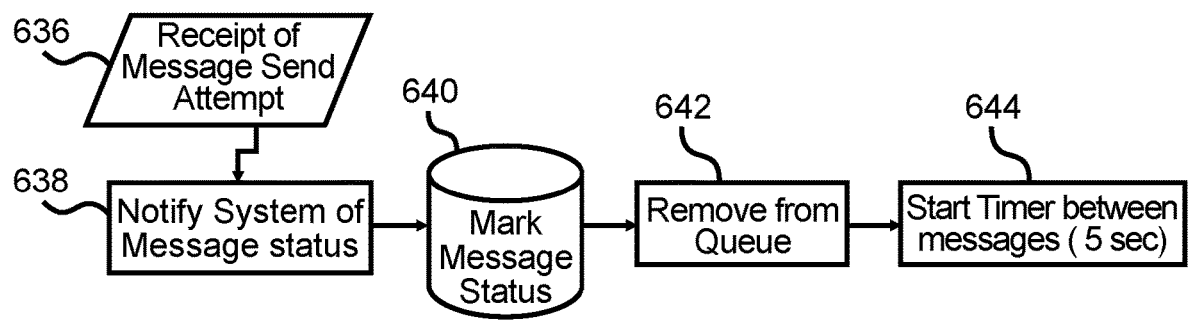

FIGS. 7A-B associate with flow diagram representation of device messaging in accordance with one described embodiment. The process depicts an exemplary hierarchical flow right from the beginning start 600, then checking the network status 602, firstly sending message 604, either No 606 or Yes 606 a, secondly upon updating the message queue 606, finally get next message by priority 616 will be received. Subsequently, time to send 618 message follows up, and thereupon receiving the correct instruction for sending the same 630, transport layer will be ready 632, if the layer is ready to receive the message, post message to the transport layer 634, lastly on the receipt of the message send attempt 636 the system will notify the system for the status of the message 638. Afterwards mark the message status 640, upon marking the message remove from the queue. The embodiment thus describes device messaging in accordance with the illustrative embodiment hereto.

Figure 8:
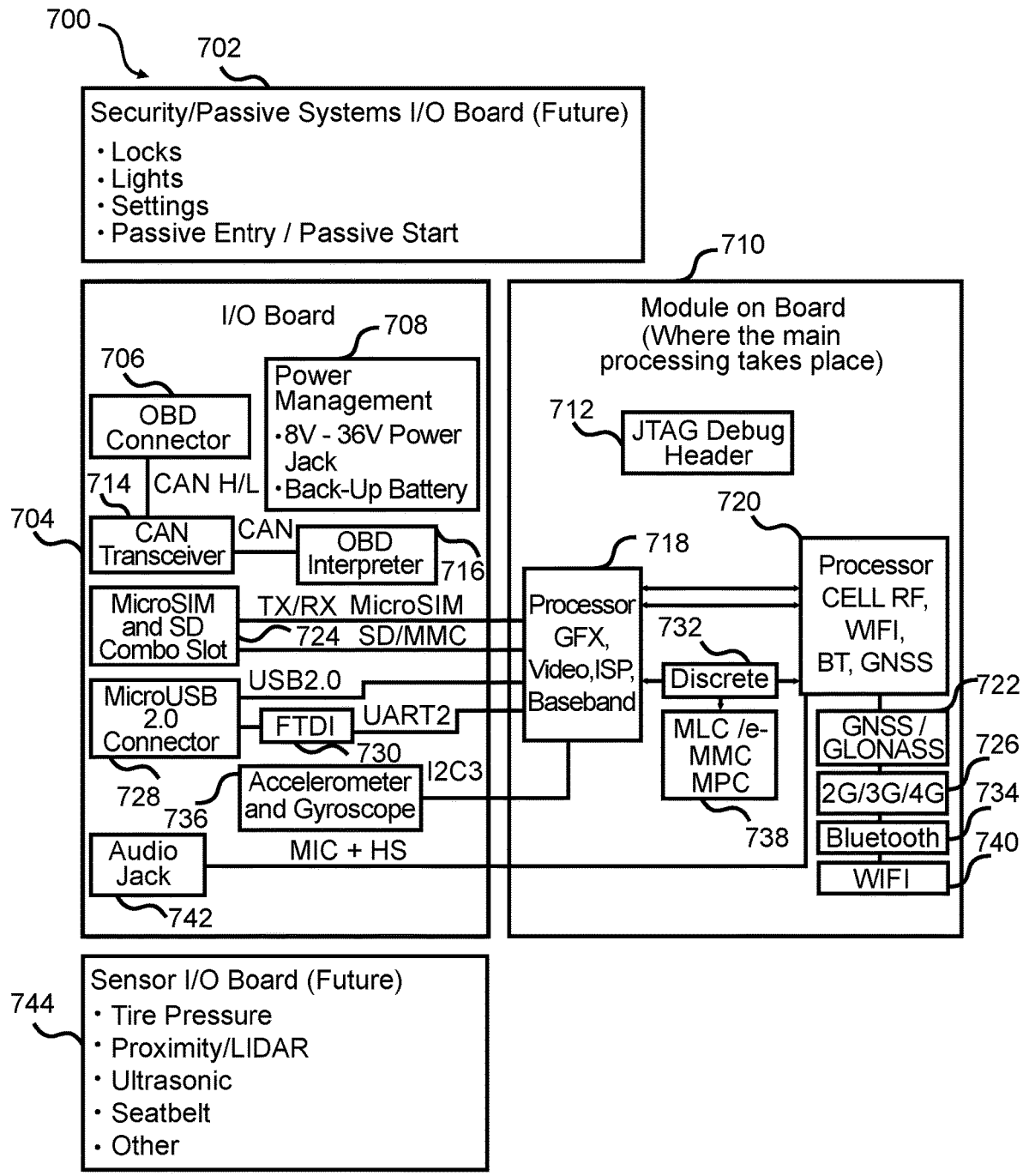
FIG. 8 demonstrates the system block diagram of the device and method in accordance with one described embodiment. Depicts the various hardware components and their connectivity on the device.

FIG. 8 demonstrates the system block diagram of the device and method in accordance with one described embodiment. Depicts the various hardware components and their connectivity on the device. The system block diagram includes security/passive systems I/O Board (Future) 702, I/O Board 704, module on Board 710, where the main processing is taking place, sensor I/O Board (Future) 744, which helps in connecting to the other sensors in the cars, enabling to read data or other information from the sensor itself. The embodiment thus describes system block diagram in accordance with the illustrative embodiment hereto.

The present invention addresses the shortfalls and provides for a low-cost communication device to connect the vehicle to the driver and other nearby vehicles or infrastructure and also allows the user to improve his or her driving behavior when the device detects any driving infraction. The device only reports the infraction to the authorities if the driving behavior doesn't improve beyond a given set time, and provides a very secure data communication environment for vehicular information.

Advantages of the present invention over prior art will become apparent to one skilled in the art as they read the remainder of this document and associated drawings.

Therefore, the foregoing description is considered as illustrative only of the principles of the invention. Further since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system of two-way wireless communication for monitoring a vehicle, comprising an input unit, a processing unit and an output unit, wherein
   a. the input unit comprises:
      i. one or more in-vehicle sensors for real time detection in and around the vehicle;
      ii. an Onboard Diagnostic (OBD) connector device for real time monitoring of driving conditions for the vehicle and a driver behavior while a driver drives the vehicle; and
      iii. a law enforcement representation with a real time view of the driver of the vehicle to identify a potential driving infraction;
   b. the processing unit comprises:
      i. a computerized data processing unit to analyze data from the one or more in-vehicle sensors and the OBD connector device; and
      ii. a communication unit to establish a two-way communication network between the vehicle and a user selected from the group consisting of insurance companies, public authorities, police and car manufacturers, and an On-Board Augmented Intelligence processing device that communicates with external sensors installed in the vehicle to record the driver behavior and to report a state selected from the group consisting of drowsy driving, distracted driving, mobile phone usage and other mobile device usage by the driver when driving, wherein when a driving infraction is recognized or the driver is determined to be in the state, the On-Board Augmented Intelligence processing device, based on internal logic, transmits an audio message or other notification to alert the driver via the output unit;
   c. the output unit comprises:
      i. an audio unit containing speakers and an amplifier;
      ii. a mobile phone application; and
      iii. a desktop solution configured to be used by the user for reporting the state, issuing fines for violations, setting parameters for enforcement of: driving rules, speed limits, and traffic regulations, wherein the system of two-way wireless communication is configured to allow the user to monitor a status of the vehicle:
         by collecting data from an information database of the vehicle in real time with help of OBD connector device and the one or more in-vehicle sensors,
         by feeding the collected data into the computerized data processing unit, and
         by generating an alert or a message to the user in real time via a Random Phase Multiple Access (RPMA) Network communication unit or cellular technology about a vehicle's and a driver's compliance with traffic regulations as well as a current vehicle's mechanical condition,
   wherein the system of two-way wireless communication is configured to plan two or more different geo-fencing regimes corresponding to the driver and one or more different drivers, the system comprises:
      the RPMA Network communication unit for identifying the driver or the one or more different drivers,
      the OBD connector for collecting a vehicle driving route information, and
      the processing unit with an Intelligence Artificial Intelligence solution as well as a Global Positioning System (GPS) unit to establish a geo-fence corresponding to the driver or the one or more different drivers.

2. The system of claim 1, wherein the OBD connector device collects one or more vehicle's operation data selected from the group consisting of a speed during acceleration and deceleration, a driver's seat belt connection detection, an engine or operational parameter selected from the group consisting of oil level, temperature, fuel level, water level, an internal or external light status, a tire pressure, a filter status, a potential leak and a fluid level, a wiper status, an indicator, a warning light that goes on when a fault occurs in a device status, a turning force, a number of passengers, a cruise control system status, and a lane departure warning.

3. The system of claim 1, wherein the OBD connector device detects at least a GPS latitude and a GPS longitude, a time of day, G Forces, a low battery level in the OBD connector device, a disconnection of device from a port in the OBD connector device, or weather information selected from temperature, humidity and barometric pressure via externally installed sensors.

4. The system of claim 1, wherein the communication unit consists of the following modules: a GPRS communication module, a 3G communication module, a 4G communication module, a 5G communication module, a random phase multiple access (RPMA) network communication module and a Bluetooth communication module.

5. The system of claim 1, wherein the communication unit consists of a random phase multiple access (RPMA) network communication module or cellular technology selected from the group consisting of 3G, 4G, LTE and 5G communication networks.

6. The system of claim 1, wherein the user includes an additional user selected from the group consisting of nearby vehicles, governmental and other agencies, interested third parties in-vehicle sensors/cameras, and communicating infrastructure selected from the group consisting of smart stoplights, street lights and personal devices.

7. The system of claim 1, wherein the audio unit generates alarms and alerts directed by the processing unit and is connected via Bluetooth to one or more personal devices in vehicle selected from the group consisting of mobile phones and vehicle's infotainment system.

8. A method of allowing a user to monitor a status of a vehicle, comprising:
   a. collecting data from an information database of the vehicle in real time with help of Onboard Diagnostic (OBD) connector device and one or more in-vehicle sensors,
   b. feeding the collected data into a computerized data processing unit, and,
   c. connecting the OBD connector device for real time monitoring of driving conditions for the vehicle and of a driver behavior while a driver drives the vehicle, wherein an On-Board Augmented Intelligent processing device communicates with external sensors installed in the vehicle to record the driver behavior and reports a state selected from the group consisting of drowsy driving, distracted driving, mobile phone usage and other devices usage by the driver when driving, wherein when a driving infraction is recognized or the driver is determined to be in the state, the On-Board Augmented Intelligence processing device, based on internal logic, transmits an audio message or other notification to alert the driver via the output unit, d. planning two or more different geo-fencing regimes corresponding to the driver and one or more different drivers comprising:
  a Random Phase Multiple Access (RPMA) Network communication unit communication unit identifying the driver and the one or more different drivers, the OBD connector collecting vehicle driving route information, and
  the processing unit with an Intelligence Artificial Intelligence solution as well as a Global Positioning System (GPS) unit to establish a geo-fence corresponding to the driver or the one or more different drivers, and e. generating an alert or a message to user in real time via the RPMA Network communication unit or cellular technology about a vehicle's and a driver's compliance with traffic regulations as well as a current vehicle's mechanical condition.

9. The method of claim 8, wherein the user is a law enforcement agency and further comprising transmitting to the user, via the RPMA Network communication unit vehicle's non-compliance with a traffic regulation.

10. The method of claim 8, wherein the information database of the vehicle comprises information selected from the group consisting of a vehicle's speed, an acceleration of the vehicle, a deceleration of the vehicle, a driver's seat belt connection detection, an engine and or operational parameter selected from the group consisting of an oil level, a temperature, a fuel level, a fluid level, a water level, an internal or external light status, a tire pressure, a filter status, a potential leak, a wiper status, indicators, a warning light that goes on when a fault occurs in a device status, a turning force, a number of passengers, a cruise control system status, and a lane departure warning.

11. The method of claim 8, wherein the cellular technology is a 3G, 4G, LTE or 5G network.

12. The system of claim 1, wherein the system generates alerts if vehicle is driven outside of vehicle's associated geo-fence for the driver.

13. The system of claim 1, wherein the cellular technology is a 3G, 4G, LTE or 5G network.

14. The method of claim 8, wherein the user is a law enforcement agency and further comprising transmitting to the user, via the RPMA Network communication unit a report about a current vehicle's mechanical condition after a predetermined period of time.

15. The method of claim 8, wherein the user selected from the group consisting of insurance companies, public authorities, police and car manufacturers and further comprising transmitting to the user, via the RPMA Network communication unit a report about the state when the driver is determined to be in the state.

* * * * *